US011252625B2

United States Patent
Chen et al.

(10) Patent No.: US 11,252,625 B2
(45) Date of Patent: Feb. 15, 2022

(54) ELECTRONIC DEVICE, METHOD AND STORAGE MEDIUM FOR WIRELESS COMMUNICATION SYSTEM

(71) Applicant: Sony Corporation, Tokyo (JP)

(72) Inventors: Wei Chen, Beijing (CN); Di Han, Beijing (CN); Bo Bai, Beijing (CN); Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 330 days.

(21) Appl. No.: 16/479,612

(22) PCT Filed: May 10, 2018

(86) PCT No.: PCT/CN2018/086252
§ 371 (c)(1),
(2) Date: Jul. 22, 2019

(87) PCT Pub. No.: WO2018/205963
PCT Pub. Date: Nov. 15, 2018

(65) Prior Publication Data
US 2021/0337450 A1    Oct. 28, 2021

(30) Foreign Application Priority Data

May 10, 2017  (CN) .......................... 201710325293.4

(51) Int. Cl.
*H04W 36/20*  (2009.01)
*H04W 36/00*  (2009.01)

(52) U.S. Cl.
CPC ....... *H04W 36/20* (2013.01); *H04W 36/0016* (2013.01); *H04W 36/0072* (2013.01)

(58) Field of Classification Search
None
See application file for complete search history.

(56) References Cited

U.S. PATENT DOCUMENTS

2011/0312327 A1* 12/2011 Kubota ................. H04W 36/20
                                                               455/436
2012/0328031 A1* 12/2012 Pajukoski ............ H04B 7/0469
                                                              375/259

(Continued)

FOREIGN PATENT DOCUMENTS

CN        101964980 A      2/2011
CN        102754457 A     10/2012

(Continued)

OTHER PUBLICATIONS

International Search Report and Written Opinion dated Aug. 8, 2018 for PCT/CN2018/086252 filed on May 10, 2018, 8 pages including English Translation of the International Search Report.

*Primary Examiner* — Kodzovi Acolatse
(74) *Attorney, Agent, or Firm* — Xsensus LLP

(57) ABSTRACT

Disclosed are an electronic device, method and storage medium for a wireless communication system. The electronic device for the wireless communication system comprises processing circuitry configured to, determine resource multiplexing pattern information for a plurality of terminal devices within the first cell; and inform a second electronic device serving a second cell of the determined resource multiplexing pattern information for the plurality of terminal devices within a first cell.

17 Claims, 20 Drawing Sheets

(56) References Cited

U.S. PATENT DOCUMENTS

| | | | |
|---|---|---|---|
| 2013/0064204 A1* | 3/2013 | Sun | H04L 1/0025 |
| | | | 370/329 |
| 2014/0140360 A1* | 5/2014 | Nikopour | H04J 13/00 |
| | | | 370/479 |
| 2015/0085838 A1* | 3/2015 | Benjebbour | H04B 7/0617 |
| | | | 370/336 |
| 2018/0054270 A1* | 2/2018 | Xiong | H04B 7/0417 |
| 2018/0109987 A1* | 4/2018 | Xu | H04W 36/04 |
| 2019/0053085 A1* | 2/2019 | Pao | H04L 5/1469 |
| 2019/0380077 A1* | 12/2019 | Kim | H04W 36/16 |

FOREIGN PATENT DOCUMENTS

| | | |
|---|---|---|
| CN | 105656609 A | 6/2016 |
| WO | 2016/101518 A1 | 6/2016 |

\* cited by examiner $$F = \begin{bmatrix} 1 & 1 & 1 & 1 & 0 & 0 & 0 & 0 & 0 \\ 1 & 0 & 0 & 0 & 1 & 1 & 1 & 0 & 0 \\ 0 & 1 & 0 & 0 & 1 & 0 & 0 & 1 & 1 & 0 \\ 0 & 0 & 1 & 0 & 0 & 1 & 0 & 1 & 0 & 1 \\ 0 & 0 & 0 & 1 & 0 & 0 & 1 & 0 & 1 & 1 \end{bmatrix} = (f_1, f_2, \ldots, f_{10})$$

$$F = \begin{bmatrix} 1 & 1 & 1 & 1 & 0 & 0 & 0 & 0 & 0 & 0 \\ 1 & 0 & 0 & 0 & 1 & 1 & 1 & 0 & 0 & 0 \\ 0 & 1 & 0 & 0 & 1 & 0 & 0 & 1 & 1 & 0 \\ 0 & 0 & 1 & 0 & 0 & 1 & 0 & 1 & 0 & 1 \\ 0 & 0 & 0 & 1 & 0 & 0 & 1 & 0 & 1 & 1 \end{bmatrix} = (f_1, f_2, \ldots, f_{10})$$

Fig. 7A $$F = \begin{bmatrix} 1 & 1 & 1 & 1 & 0 & 0 & 0 & 0 & 0 \\ 1 & 0 & 0 & 0 & 1 & 1 & 1 & 0 & 0 \\ 0 & 1 & 0 & 0 & 1 & 0 & 0 & 1 & 1 & 0 \\ 0 & 0 & 1 & 0 & 0 & 1 & 0 & 1 & 0 & 1 \\ 0 & 0 & 0 & 1 & 0 & 0 & 1 & 0 & 1 & 1 \end{bmatrix} = (f_1, f_2, \ldots, f_{10})$$

Fig. 7B $$F = \begin{bmatrix} 1 & 1 & 1 & 1 & 0 & 0 & 0 & 0 & 0 & 0 \\ 1 & 0 & 0 & 0 & 1 & 1 & 1 & 0 & 0 & 0 \\ 0 & 1 & 0 & 0 & 1 & 0 & 0 & 1 & 1 & 0 \\ 0 & 0 & 1 & 0 & 0 & 1 & 0 & 1 & 0 & 1 \\ 0 & 0 & 0 & 1 & 0 & 0 & 1 & 0 & 1 & 1 \end{bmatrix} = (f_1, f_2, \ldots, f_{10})$$

| configuration 1 | configuration 2 |
|---|---|
| resource node a | resource node a1 |
| resource node b | resource node b |
| resource node c | resource node c |
| resource node d | resource node d |
| resource node e | resource node e |

Fig. 8

$$G = \begin{bmatrix} 1 & 1 & 1 & 1 & 0 & 0 & 0 & 0 \\ 1 & 1 & 0 & 0 & 1 & 1 & 0 & 0 \\ 1 & 0 & 1 & 0 & 1 & 0 & 1 & 0 \\ 0 & 0 & 0 & 1 & 0 & 1 & 1 & 1 \end{bmatrix} = (g_1, g_2, \ldots, g_8)$$

| determining resource multiplexing pattern information for a plurality of terminal devices within a first cell | 1350 |

↓

| informing a second electronic device serving a second cell of the determined resource multiplexing pattern information for the plurality of terminal devices within the first cell | 1360 |

| obtaining resource multiplexing pattern information for a plurality of terminal devices within a first cell | 1370 |

Fig. 13B

ELECTRONIC DEVICE, METHOD AND STORAGE MEDIUM FOR WIRELESS COMMUNICATION SYSTEM

CROSS-REFERENCE TO RELATED APPLICATIONS

The present application is based on PCT filing PCT/CN2018/086252, filed May 10, 2018, which claims priority to CN 201710325293.4, filed May 10, 2017, the entire contents of each are incorporated herein by reference.

TECHNICAL FIELD

The present disclosure relates generally to wireless communication systems, and in particular, to resource allocation and inter-cell interference coordination techniques in wireless communication systems.

BACKGROUND ART

With the scale application of wireless communication technologies and the rapid development of wireless communication services, the performance requirements of wireless communication systems are increasing so as to meet the evolving demands of users. For example, 5G systems have raised higher system performance requirements in aspects of the peak rate of communication, spectrum efficiency, and mobility and so on.

These system performance requirements can be achieved through a variety of technologies at different levels. For example, in order to improve system spectral efficiency, future wireless communication systems are likely to reuse frequency resources as much as possible between cells. Moreover, a variety of new multiple access methods have been proposed, including Sparse Code Multiple Access (SCMA), Pattern Division Multiple Access (PDMA), and Interleave Division Multiple Access (IDMA), etc., so as to improve the system spectrum efficiency, increase the number of terminal devices that can access the system, and reduce the delay.

SUMMARY OF THE INVENTION

One aspect of the disclosure relates to an electronic device for a wireless communication system. According to one embodiment, the electronic device can be a first electronic device serving a first cell and comprises a processing circuitry, and the processing circuitry can be configured to determine resource multiplexing pattern information for a plurality of terminal devices within the first cell, and inform a second electronic device serving a second cell of the determined resource multiplexing pattern information for the multiple terminal devices within the first cell.

Another aspect of the disclosure relates to another electronic device for a wireless communication system. According to one embodiment, the electronic device can be a second electronic device serving a second cell and comprises a processing circuitry, and the processing circuitry can be configured to obtain resource multiplexing pattern information for a plurality of terminal devices within a first cell.

Another aspect of the disclosure relates to a method for a wireless communication system. In one embodiment, the method can comprise, by a first electronic device serving a first cell, determining resource multiplexing pattern information for a plurality of terminal devices within the first cell, and informing a second electronic device serving a second cell of the determined resource multiplexing pattern information for the plurality of terminal devices within the first cell.

Another aspect of the disclosure relates to another method for a wireless communication system. In one embodiment, the method can comprise, by a second electronic device serving a second cell, obtaining resource multiplexing pattern information for a plurality of terminal devices within a first cell.

Another aspect of the disclosure relates to a computer-readable storage medium storing one or more instructions. In some embodiments, the one or more instructions, when executed by one or more processors of an electronic device, cause the electronic device to perform methods in accordance with various embodiments of the present disclosure.

Another aspect of the present disclosure relates to a terminal device for a wireless communication system. In one embodiment, the terminal device can comprise a processing circuitry, and the processing circuitry can be configured to provide user related information concerning the terminal device to a base station serving a first cell, for determining resource multiplexing pattern information for a plurality of terminal devices within the first cell, and obtain the resource multiplexing pattern information for the terminal device from the base station serving the first cell. Wherein the base station informs a second base station serving a second cell of the determined resource multiplexing pattern information for the plurality of terminal devices within the first cell.

The above summary is provided to summarize some exemplary embodiments in order to provide a basic understanding of the various aspects of the subject matter described herein. Therefore, the above-described features are merely examples and should not be construed as limiting the scope or spirit of the subject matter described herein in any way. Other features, aspects, and advantages of the subject matter described herein will become apparent from the Detailed Description described below in conjunction with the drawings.

BRIEF DESCRIPTION OF THE DRAWINGS

A better understanding of the present disclosure can be achieved by referring to the detailed description given hereinafter in connection with the accompanying drawings, wherein same or similar reference signs are used to indicate same or similar components throughout the figures. The figures are included in the specification and form a part of the specification along with the following detailed descriptions, for further illustrating embodiments herein and explaining the theory and advantages of the present disclosure. Wherein:

FIGS. 7A-9 illustrate exemplary operations of determining resource multiplexing pattern information in different multiple access systems, in accordance with an embodiment of the present disclosure.

FIG. 13A and FIG. 13B illustrate example methods for communication in accordance with an embodiment of the disclosure.

Figure 1A:
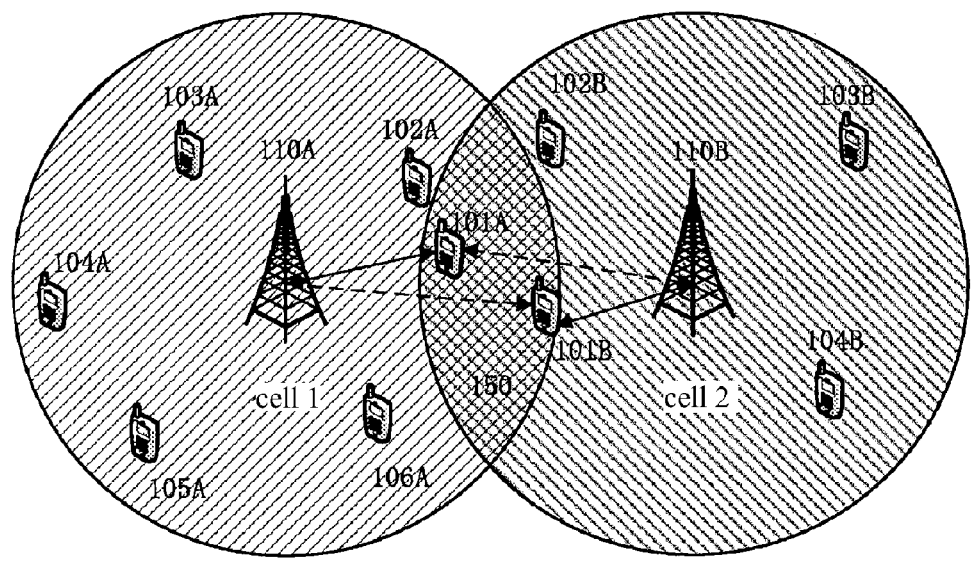
FIG. 1A and FIG. 1B illustrate an exemplary wireless communication system in which a solution in accordance with an embodiment of the present disclosure can be applied.

While the embodiments herein are susceptible to various modifications and alternative forms, the specific embodiments thereof are illustrated in the drawings by way of example and are described in detail herein. It should be understood, however, that the drawings and the detailed description thereof are not intended to limit the embodiments to the specific forms as disclosed, rather, it is intended to cover all modifications, equivalents and alternatives falling within the spirit and scope of the claims.

DESCRIPTION OF EMBODIMENTS

Exemplary embodiments herein will be described hereinafter with reference to the accompanying drawings. For the sake of clarity and conciseness, not all features of actual implementation are described in the specification. However, it should be appreciated that implementation specific decisions must be made in the development of any such actual embodiment, so as to achieve specific goals of the developer. For example, to comply with constrain conditions related to system and business, and these constrain conditions may vary from implementation to implementation. Furthermore, it will also be appreciated that the development work may be more complicated and time consuming, although such development work is merely a routine task for those skilled in the art having benefit of this disclosure.

Only the device structure and/or operational steps closely related to the solutions according to the present disclosure are shown in the drawings in order to avoid obscuring the present disclosure with unnecessary detail, and other details that have little relation to the present disclosure are omitted.

Herein, the resource multiplexing pattern can be understood as a way of using resources such as in a time domain, a frequency domain, and a code domain by a terminal device. This way of usage can form a correspondence between the terminal device and various resources, and the correspondence can in turn distinguish different data flows between individual terminal devices. In various systems, there can be multiple resource multiplexing patterns at the system level, and corresponding resource multiplexing patterns can be allocated or arranged for each terminal device from multiple resource multiplexing patterns at the system level.

In traditional multiple access systems, multiple resource multiplexing patterns at the system level are orthogonal, and resource multiplexing patterns allocated to each terminal device are also orthogonal, thus different data streams are also orthogonal therebetween. For example, in a CDMA system, multiple orthogonal resource multiplexing patterns at the system level can be considered to be defined based on a plurality of predetermined orthogonal codewords. The resource multiplexing pattern for each terminal device, that is, the codeword, can be determined from the multiple orthogonal codewords by the allocation of the codewords. For another example, in an OFDMA system, a scheduled time-frequency resource allocation result can be considered to define a plurality of orthogonal resource multiplexing patterns at the system level. Through resource scheduling, orthogonal resource multiplexing patterns for each terminal device, that is, scheduled time-frequency resources that are orthogonal to (i.e., non-overlapping with) other terminal devices, can be determined.

In the novel multiple access system, a plurality of resource multiplexing patterns at the system level may not be completely orthogonal, that is, a portion of resource multiplexing patterns can be orthogonal therebetween, but there are also resource multiplexing patterns that are not orthogonal to each other. As thus, the resource multiplexing patterns allocated to each terminal device may also not be completely orthogonal, thus different data streams may not be completely orthogonal as well therebetween. For example, in an SCMA system, it can be considered that a plurality of resource multiplexing patterns at the system level are defined based on a predetermined codebook (which can include a mapping matrix and a constellation). The sparse codewords in the SCMA system are not completely orthogonal, so the plurality of resource multiplexing patterns at its system level are not completely orthogonal. Through the codeword allocation, the resource multiplexing pattern for each terminal device, that is, the codeword, can be determined from the codebook. For another example, in a PDMA system, it can be considered that a plurality of incompletely orthogonal resource multiplexing patterns at the system level are defined based on a predetermined pattern matrix, and a resource multiplexing pattern for each terminal device can be determined from the pattern matrix, that is, the pattern matrix vector. For yet another example, in an IDMA system, it can be considered that a plurality of incompletely orthogonal resource multiplexing patterns of the system are defined based on a predetermined interleaver, and a resource multiplexing pattern for each terminal device can be determined from a plurality of interleavers, that is, a certain interleaver. Herein, the orthogonality or incomplete orthogonality of resource multiplexing patterns is sometimes referred to as orthogonality or incomplete orthogonality of resources. The former and the latter terms result in the orthogonality or incomplete orthogonality of different data streams.

Herein, the resource multiplexing pattern of each terminal device can also be referred to as resource multiplexing pattern information of the terminal devices or resource multiplexing pattern information for the terminal devices. In some examples, the resource multiplexing pattern information of the terminal device can include a correspondence between all or part of the terminal devices (for example, at a cell edge) and corresponding resource multiplexing patterns in the cell, or can include only the resource multiplexing patterns allocated to all or part of the terminal devices (for example, at a cell edge) in the cell, without indicating a correspondence with the terminal device.

In some examples, the orthogonality of resource multiplexing patterns or resources can be reflected by correlation, as described below, in various novel multiple access systems, the above described incomplete orthogonal characteristics can allow more terminal devices to access the wireless communication system on the one hand, and affect the detection performance of the plurality of terminal devices on the other hand. In these novel multiple access systems, although the incomplete orthogonality between different resource multiplexing patterns or resources can be compensated by corresponding mechanisms (e.g., more complex detection algorithms), maintaining or increasing this orthogonality can still be an important means to improve detection performance.

Herein, user related information can include at least one of location information, channel state information, and device information of the terminal device. The location information can be obtained, for example, based on GPS measurements or triangulation etc., and can, in some embodiments, facilitate determination of the terminal device e.g., located at the edge of a cell) for which inter-cell interference exists. The channel state information can, for example, include channel state information for the uplink and/or channel state information for the downlink, and can, in some embodiments, facilitate evaluation of potential inter-cell interference to the uplink and/or downlink, respectively. The device information can include, for example, information such as a service type, receiving sensitivity etc., of the terminal device, where the service type information can indicate the priority of a terminal device, and the receiving sensitivity can assist in evaluating potential inter-cell interference to the downlink (e.g., in order to achieve a certain receiving performance, a terminal device having a higher receiving sensitivity may only require a lower base station transmission power and thus may cause lower interference). In some embodiments, the information itself or its indicated information can be helpful in determining a resource multiplexing pattern for the terminal device. As described in detail below, in some embodiments, the resource multiplexing pattern information for a terminal device of a present cell can be determined based on the user related information of the present cell and a neighboring cell.

The term inter-cell interference is also used herein. Reusing of spectrum resources inter-cell on the one hand can improve the spectrum efficiency of the system, and on the other hand can also cause interference between adjacent cells, that is, inter-cell interference. In general, an area where inter-cell interference exists may be located at the edge where different cells (e.g., neighboring cells) intersect. In order to ensure the communication quality of the terminal devices at the cell edge, the uplink and downlink transmission power used for communication with these terminal devices is often increased by power control technology, which increases the possibility of occurrence of inter-cell interference. As described in detail below, inter-cell interference can include interference of adjacent cells between uplinks and between downlinks. Some embodiments herein are described with reference to one of the uplink and downlink, or are not explicitly indicated to be uplink or downlink. At that point, these embodiments should be understood to be applicable to both uplink and downlink, unless otherwise stated. In order to solve or mitigate the inter-cell interference problem, a feasible approach is to allocate resource multiplexing patters/resources that are as orthogonal or non-overlapping as possible to the terminal devices in the interference region from, for example, resource multiplexing patterns/resources that are not completely orthogonal.

Exemplary Wireless Communication System

FIG. 1A illustrates an exemplary wireless communication system in which a solution in accordance with an embodiment of the present disclosure may be applied. It should be understood that the system of FIG. 1A is only one example of various possible systems that can be implemented as various communication systems as desired.

As shown in FIG. 1A, a wireless communication system 100 includes a base station 110A and a base station 110B and a plurality of terminal devices 101A-106A and 101B-104B, and the base station 110A and the base station 110B communicate with one or more terminal devices by wireless transmission, Each terminal device can be randomly distributed within the corresponding cell, where some terminal devices can be located at the cell edge, and some terminal devices can be located at the cell center. The communication between the base station and the terminal device can follow any desired Radio Access Technology (RAT), such as various existing and future RATs, including but not limited to GSM, UMTS, LTE series, New Radio of 5G and more. The base station 110A and the base station 110B can each have an interface (not shown) for connecting to each other for signaling exchange. The interface can be a wired (e.g., fiber optic) interface or a wireless interface. For example, the interface can be an X2 interface between eNBs in an LTE system, an Xx interface between eLTE eNBs in an eLTE system, or an Xn interface between eNBs in a New Radio system. In various embodiments of the present disclosure, various messages or signaling between base stations or similar entities can be communicated through an interface between them, such as the above interfaces.

The base stations 110A and 110B can provide wireless signal coverage over a certain geographic area to provide various communication services for terminal devices within the geographic area. In an embodiment of the present disclosure, the covered area can be referred to as a cell. As shown in FIG. 1A, base station 110A and base station 110B can serve terminal devices in cell 1 and cell 2, respectively. FIG. 1A illustrates the case of an omnidirectional cell covered by an omnidirectional antenna. In some cases, a certain range of angles (e.g., 120 degrees, 180 degrees, etc.) can be covered by a directional antenna, forming a sectorized cell. Herein, the various operations with reference to omnidirectional cell 1 and cell 2 are equally applicable to sectorized cells. In still other cases, the base station can use beamforming techniques to transmit and receive wireless signals. At that time, since the beam has strong directivity, the coverage area corresponding to each beam can be similarly understood as one cell. Herein, the various operations with reference to omnidirectional cell 1 and cell 2 are equally applicable to cells corresponding to such a beam, and the corresponding control functions can be performed by functional entities that control each beam.

Figure 2:
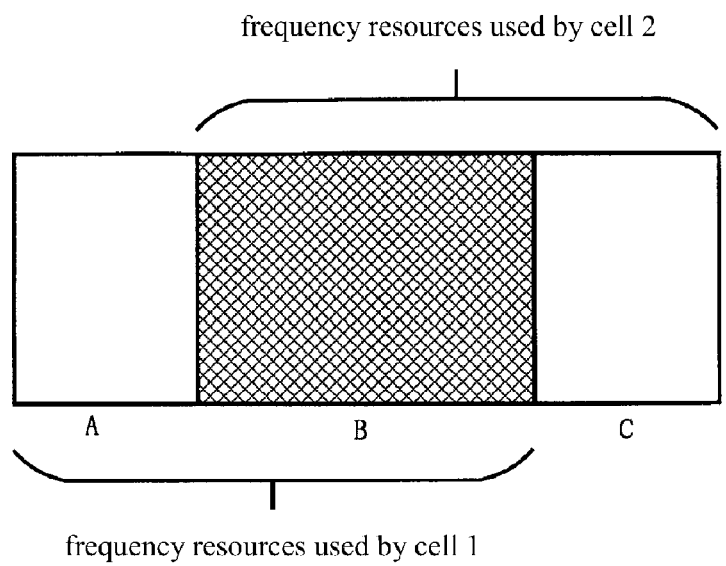
FIG. 2 illustrates a schematic diagram of inter-cell spectrum allocation according to an embodiment of the present disclosure.

According to some embodiments, in order to achieve higher system spectral efficiency, cell 1 and cell 2 can reuse resources (e.g., physical resource blocks) on at least a portion of the frequency bands to simultaneously serve respective user devices that are close to each other. FIG. 2 illustrates a schematic diagram of inter-cell spectrum allocation according to such an embodiment. As illustrated in FIG. 2, the spectrum resources used by the cell 1 and the cell 2 partially overlap. Specifically, the spectrum resources used by the cell 1 include portions A and B, and the spectrum resources used by the cell 2 include portions C and B, wherein portion B is reused by the cell 1 and the cell 2. In some embodiments, the portion of the spectrum resource that is reused can be adjusted as desired. For example, in order to further improve the spectral efficiency of the system, portion B of the reused spectrum resource can be increased, and even the spectrum resources used by the cell 1 and the cell 2 are made completely overlapped.

While improving the spectral efficiency of the system, inter-cell reuse of spectrum resources can cause inter-cell interference. As illustrated in FIG. 1A, the cell 1 and the cell 2 are neighboring cells, for the cell edge 150 where the two cells intersect, both the signal coverage of the cell 1 and the signal coverage of the cell 2 exist. There may be interference between communication links of different cells, so area 150 can be considered to be an area where inter-cell interference may exist. Specifically, inter-cell interference may exist in the downlink. As illustrated in FIG. 1A, terminal device 101A (served by base station 110A) and terminal device 101B (served by base station 110B) are located in the inter-cell interference area. Accordingly, the useful signal (indicated by the solid line) from the base station 110A to the terminal device 101A may be interference (indicated by a broken line) for the terminal device 101B, and the useful signal (indicated by the solid line) from the base station 110B to the terminal device 101B may similarly be the interference (indicated by the dashed line) for the terminal device 101A as well. Inter-cell interference may also exist in the uplink. In FIG. 1A, the useful signal (indicated by the solid line) from the terminal device 101A to the base station 110A may be interference (indicated by a broken line) for the base station 110B to receive its useful signal, and the useful signal (indicated by the solid line) from the terminal device 101B to the base station 110B may similarly be interference (indicated by the dashed line) for the base station 110A to receive its useful signal as well.

Figure 1B:
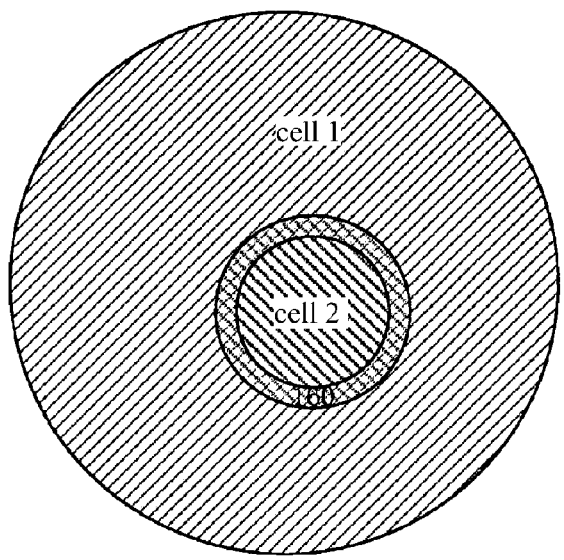

As an example, FIG. 1A illustrates that an area where inter-cell interference exists may be located at the edge where the two cells intersect. However, depending on the network deployment, the area where inter-cell interference exists can be located elsewhere in a cell. For example, in a layered network structure consisting of a macro cell and a micro cell, the micro cell may be located within the macro cell. Accordingly, there may be an area within the macro cell that interferes with the micro cell. For example, referring to FIG. 1B, cell 1 may be a macro cell, and cell 2 may be a micro cell located in macro cell 1, and cell 2 is deployed, for example, in a certain building. In this case, the area where there is interference between cells may be as illustrated by area 160, which is located at the edge of cell 2 but is located inside cell 1. In addition, although the inter-cell interference area illustrated in FIGS. 1A and 1B is of a regular shape, this is merely illustrative. For example, locations of the terminal devices 102A and 102B in FIG. 1A may also be areas where inter-cell interferences exist. Potential inter-cell interference can be assessed based on the methods described in some of the embodiments below.

In some cases, the base station needs to perform appropriate operations (e.g., determine resource multiplexing pattern information) for the terminal device for data transmission. In some cases, the base station needs to perform appropriate operations (e.g., handover related operations) for the terminal device for mobility related processing. Some related exemplary operations are described in detail herein below.

Exemplary First Electronic Device

Figure 3A:
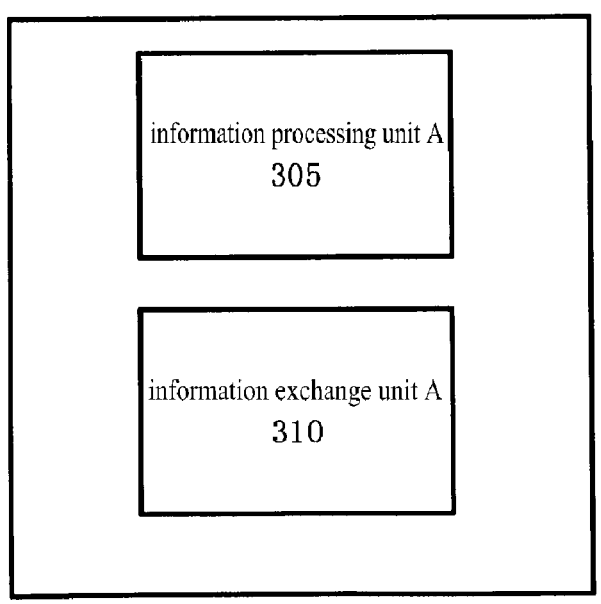
FIG. 3A illustrates an exemplary first electronic device in accordance with an embodiment of the present disclosure.

FIG. 3A illustrates an exemplary first electronic device in which the electronic device can be used in various wireless communication systems, in accordance with an embodiment of the present disclosure. The electronic device 300A illustrated in FIG. 3A can be the first electronic device serving the first cell as described herein. As illustrated in FIG. 3A, the electronic device 300A can include, for example, an information processing unit A 305 and an information exchange unit A 310. According to one implementation, the electronic device 300A can be, for example, the base station 110A (or the base station 110B) in FIG. 1A or can be part of the base station 110A (or the base station 110B), or can alternatively be a device for controlling the base station (e.g., a base station controller) or a device used in base stations or part of them.

In some embodiments, information processing unit A 305 can be configured to determine resource multiplexing pattern information for a plurality of terminal devices (e.g., 101A-106A) within a first cell (e.g., cell 1). According to the system deployment, the plurality of terminal devices can access the first cell through various multiple access methods, including but not limited to traditional multiple access methods such as CDMA and OFDMA etc., and foregoing novel multiple access methods such as SCMA, PDMA, and IDMA. It is to be noted that embodiments of the present disclosure will be primarily described with reference to SCMA (and in part with reference to PDMA and IDMA), but the concepts of the present disclosure are equally applicable to other various multiple access methods. As mentioned above, each multiple access method can have a corresponding system level resource multiplexing pattern. These resource multiplexing patterns and specific operations for determining the resource multiplexing pattern information (uplink and downlink) of the terminal devices will be specifically described below.

In some embodiments, the information exchange unit A 310 can be configured to inform a second electronic device (e.g., the electronic device 300B described below) serving a second cell (e.g., cell 2) of the determined resource multiplexing pattern information for a plurality of terminal devices (e.g., 101A to 106A) within a first cell (e.g., cell 1). Here, the second electronic device serving the second cell and the electronic device 300A serving the first cell can be peer to peer. In some cases, the two electronic devices can be peer to peer in the sense of having basic wireless communication capabilities, i.e., they can each have particular functionality as described herein. In some other cases, the two electronic devices can be peer to peer in the strict sense, and they can have the same functionalities, i.e., the second electronic device can have the functionalities described herein with reference to electronic device 300A, and the electronic device 300A can have the functionalities described herein with reference to the second electronic device. As will be described in detail below, informing the second electronic device serving the second cell of the resource multiplexing pattern information of the first cell can facilitate the second electronic device to determine resource multiplexing pattern information for terminal devices of the second cell and/or facilitate mobility management of terminal devices.

The various units of electronic device 300A can be configured to perform various operations to implement embodiments in accordance with the present disclosure, as described in detail below. In some embodiments, electronic device 300A can be implemented at the chip level, or can also be implemented at the device level by including other external components. For example, the electronic device 300A can operate as a communication device as a complete machine.

It should be noted that the above-mentioned respective units are only logical modules divided according to the specific functions they implement, and are not intended to limit specific implementations. In actual implementation, the various units described above may be implemented as separate physical entities, or may be implemented by a single entity (e.g., a processor (CPU or DSP, etc.), a processing circuitry, etc.). Wherein, the processing circuitry can refer to various implementations of digital circuitry, analog circuitry, or mixed signal (combination of analog and digital) circuitry that perform functions in a computing system. Processing elements can include, for example, circuits such as an integrated circuit (IC), an application specific integrated circuit (ASIC), a portion or circuit of a separate processor cores, an entire processor core, a separate processor, a programmable hardware device such as a field programmable gate array (FPGA), and/or systems including multiple processors.

Exemplary Second Electronic Device

Figure 3B:
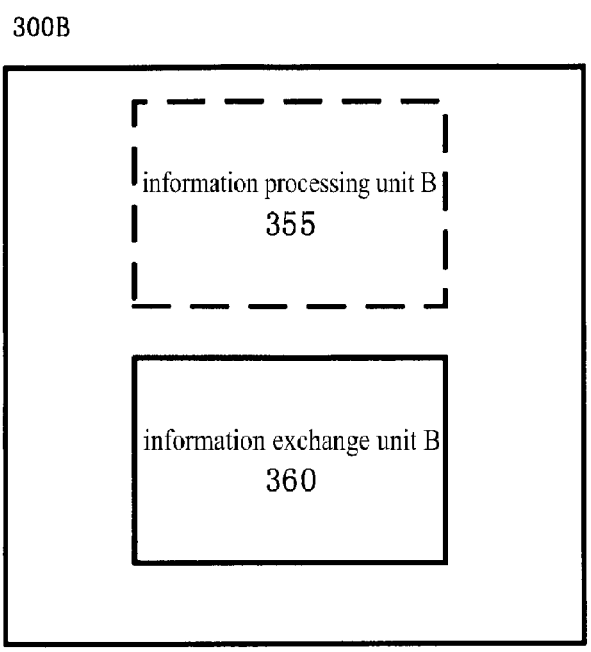
FIG. 3B illustrates an exemplary second electronic device in accordance with an embodiment of the present disclosure.

FIG. 3B illustrates an exemplary second electronic device in which the electronic device can be used in various wireless communication systems, in accordance with an embodiment of the present disclosure. The electronic device 300B illustrated in FIG. 3B can be an electronic device serving a second cell. As illustrated in FIG. 3B, the electronic device 300B can include, for example, an information exchange unit B 360. According to one implementation, the electronic device 300B can be, for example, the base station 110B (or the base station 110A) in FIG. 1A or can be part of the base station 110B (or the base station 110A), or can alternatively be a device for controlling the base station (e.g., a base station controller) or a device used in base stations or part of them.

In some embodiments, information exchange unit B 360 can be configured to obtain resource multiplexing pattern information for a plurality of terminal devices within a first cell (e.g., cell 1). In some embodiments, the resource multiplexing pattern information is provided by a first electronic device (e.g., electronic device 300A) that serves the first cell. The resource multiplexing pattern information can facilitate the electronic device 300B to determine resource multiplexing pattern information for terminal devices within the second cell (e.g., cell 2) and/or facilitate mobility management of the terminal device. As previously indicated, the electronic device 300B and the electronic device 300A serving the first cell can be peer to peer in the sense of having basic wireless communication capabilities or can be peer to peer in the strict sense.

The electronic device 300B can include additional units to implement embodiments in accordance with the present disclosure, as described in detail below. For example, electronic device 300B can further include information processing unit B 355 (as indicated by the dashed line), the specific operation of which will be described below.

In some embodiments, electronic device 300B can be implemented at the chip level, or may also be implemented at the device level by including other external components. For example, the electronic device 300B can operate as a communication device as a complete machine.

It should be noted that the above-mentioned respective units are only logical modules divided according to the specific functions they implement, and are not intended to limit specific implementations. In actual implementation, the various units described above may be implemented as separate physical entities, or may be implemented by a single entity (e.g., a processor (CPU or DSP, etc.), a processing circuitry, etc.). Wherein, the processing circuitry can refer to various implementations of digital circuitry, analog circuitry, or mixed signal (combination of analog and digital) circuitry that perform functions in a computing system. Processing elements can include, for example, circuitry such as an integrated circuit (IC), an application specific integrated circuit (ASIC), a portion or circuit of a separate processor cores, an entire processor core, a separate processor, a programmable hardware device such as a field programmable gate array (FPGA), and/or systems including multiple processors.

Determining Resource Multiplexing Pattern Information of a Terminal Device

Figure 4A:
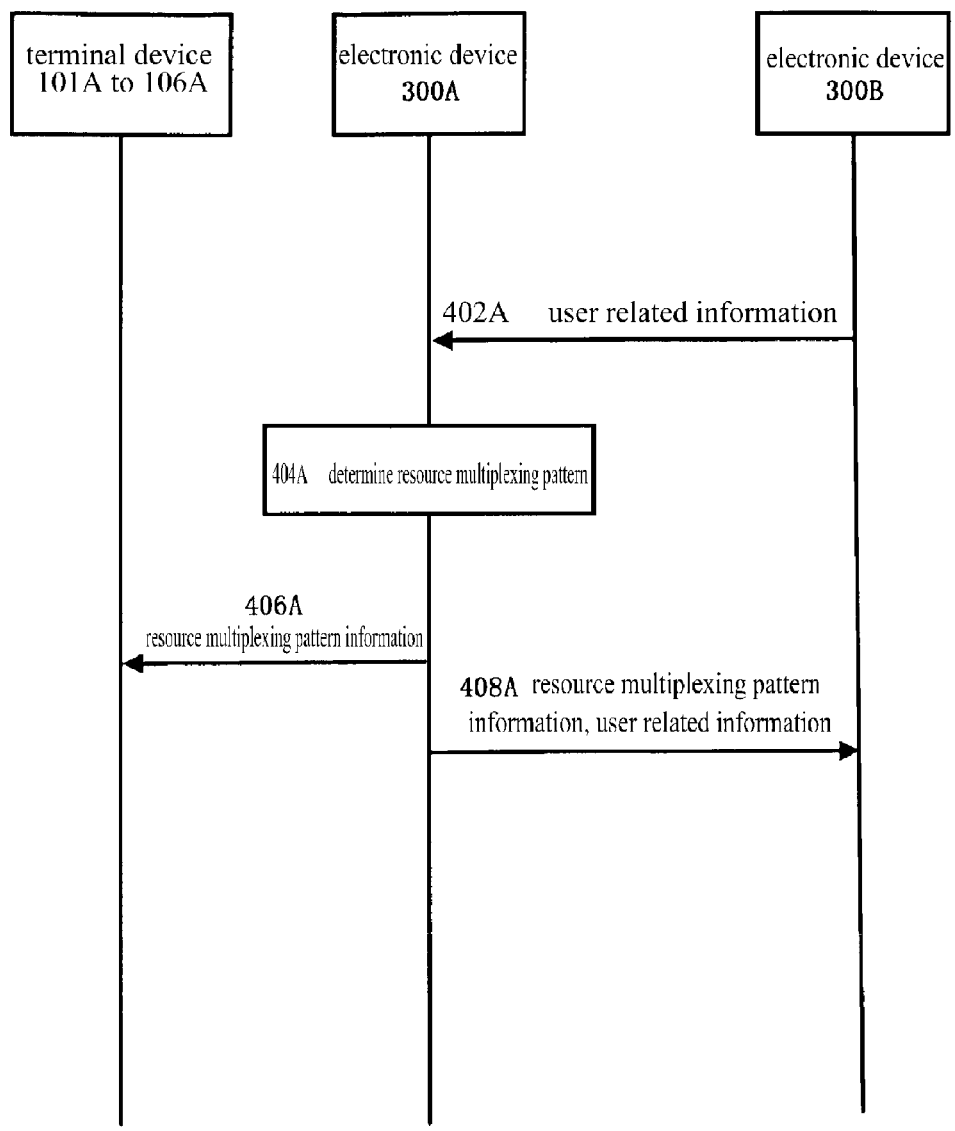
FIGS. 4A and 4B illustrate an exemplary signaling procedure related to determining resource multiplexing pattern information for a terminal device.
Figure 4B:
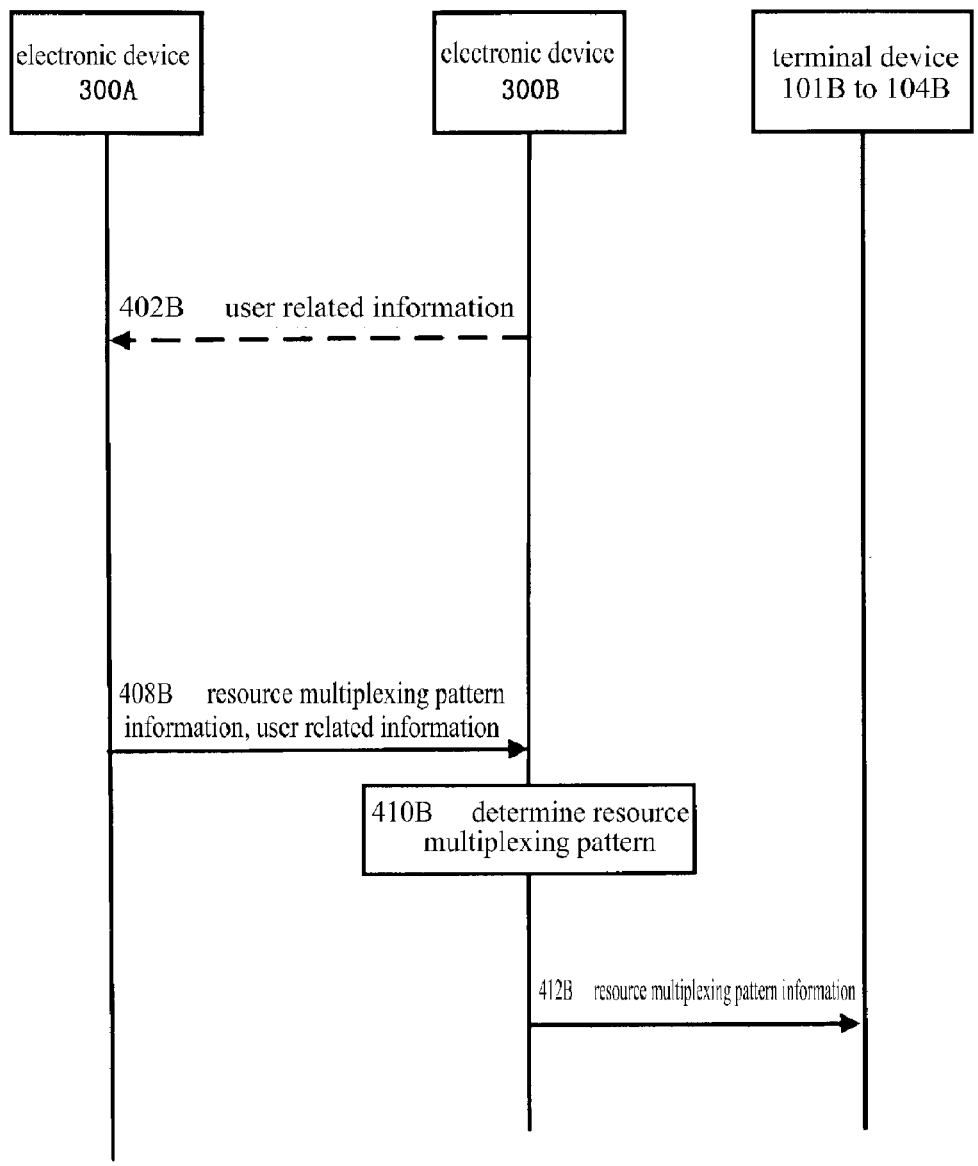

FIG. 4A and FIG. 4B respectively illustrate an exemplary signaling procedure related to determining resource multiplexing pattern information for terminal devices. Exemplary overall operations related to determining resource multiplexing pattern information for the terminal devices of the electronic devices 300A and 300B are described below with reference to the signaling procedure. These operations can be used in conjunction with any system, device, element or component or the like in accordance with the present disclosure. These operations are exemplary. In various embodiments, some of the illustrated operations can be performed in parallel, in a different order than that of illustrated, or can be omitted. Additional operations can also be performed as needed.

The context of FIG. 4A and FIG. 4B is the same as above, that is, the electronic device 300A is the first electronic device serving the first cell, and specifically, the electronic device 300A can serve the terminal devices 101A to 106A located in the first cell, and the electronic device 300B is a second electronic device serving the second cell, and specifically, the electronic device 300B can serve the terminal devices 101B to 104B located in the second cell.

As illustrated in FIG. 4A, at 402A, electronic device 300A (e.g., its information exchange unit A 310) can be configured to obtain user related information for a plurality of terminal devices within the second cell. At 404A, the electronic device 300A (e.g., its information processing unit A 305) can be configured to determine resource multiplexing pattern information for a plurality of terminal devices within the first cell based on user related information of the plurality of terminal devices within the first cell and the obtained user related information of the plurality of terminal devices within the second cell. According to some embodiments of the present disclosure, the user related information can include at least one of location information of the terminal device, (uplink and/or downlink) channel state information, and device information. At 406A, electronic device 300A (e.g., its information exchange unit A 310) can be configured to inform the plurality of terminal devices within the first cell of the determined resource multiplexing pattern information for the plurality of terminal devices within the first cell. At 408A, the electronic device 300A (e.g., its information exchange unit A 310) can be configured to inform the second electronic device 300B serving the second cell of the determined resource multiplexing pattern for the plurality of terminal devices within the first cell, for example, the determined resource multiplexing pattern information for the plurality of terminal devices in the first cell can be sent to the second electronic device 300B serving the second cell through an interface (wired or wireless) between the two electronic devices. In some examples, electronic device 300A can also send user related information for the plurality of terminal devices within the first cell to the second electronic device 300B serving the second cell at 308A.

It should be understood that operations of FIG. 4A are applicable to determining the resource multiplexing pattern information of the uplink and downlink of the terminal devices, and the electronic device 300A can determine resource multiplexing pattern information for the uplink and/or downlink of the terminal devices based on the exemplary operation of FIG. 3A. As mentioned above, the resource multiplexing pattern information of the terminal devices can include a correspondence between each terminal device and a corresponding resource multiplexing pattern. Therefore, after receiving the resource multiplexing pattern information of the terminal device of the first cell (cell 1), terminal devices 101A to 106A within the first cell can be informed of the determined (uplink and/or downlink) resource multiplexing pattern for the terminal device, and can conduct (uplink and/or downlink) communication based on the resource multiplexing pattern. After receiving resource multiplexing pattern information of terminal devices of the first cell (cell 1), the electronic device 300B can be informed of the determined (uplink and/or downlink) resource multiplexing pattern for all or part of the terminal devices within the first cell, and can determine (uplink and/or downlink) resource multiplexing pattern information of terminal devices within the cell 2 based on the resource multiplexing pattern (or further based on user related information of the terminal devices 101A to 106A).

As illustrated in FIG. 4B, at 408B, electronic device 300B (e.g., its information exchange unit B 360) can be configured to obtain resource multiplexing pattern information for a plurality of terminal devices within the first cell, and possibly user related information of the plurality of terminal devices in the first cell. In some embodiments, the obtained resource multiplexing pattern information for the plurality of terminal devices in the first cell can be determined by the electronic device 300A based on both the user related information of the plurality of terminal devices in the first cell and the second cell as described above. Accordingly, at 402B, the electronic device 300B (e.g., its information exchange unit B 360) can be configured to inform the first electronic device 300A serving the first cell of the user related information of the plurality of terminal devices within the second cell. At 410B, the electronic device 300B (e.g., its information processing unit B 355) can be configured to determine resource multiplexing pattern information for the plurality of terminal devices within the second cell based on the obtained resource multiplexing pattern information for the plurality of terminal devices within the first cell. At 412B, the electronic device 300B (e.g., its information exchange unit B 360) can then transmit the determined resource multiplexing pattern information for the plurality of terminal devices within the second cell to the plurality of terminal devices within the second cell.

It should be understood that operations of FIG. 4B are applicable to determining the resource multiplexing pattern information of the uplink and downlink of the terminal devices, and the electronic device 300B can determine resource multiplexing pattern information for the uplink and/or downlink of the terminal devices based on the exemplary operation of FIG. 3B. As mentioned above, the resource multiplexing pattern information of the terminal devices can include a correspondence between each terminal device and a corresponding resource multiplexing pattern. Therefore, after receiving the resource multiplexing pattern information of the terminal device of the second cell (cell 2), terminal devices 101B to 104B within the second cell can be informed of the determined (uplink and/or downlink) resource multiplexing pattern for the terminal device, and can conduct (uplink and/or downlink) communication based on the resource multiplexing pattern.

Figure 5A:
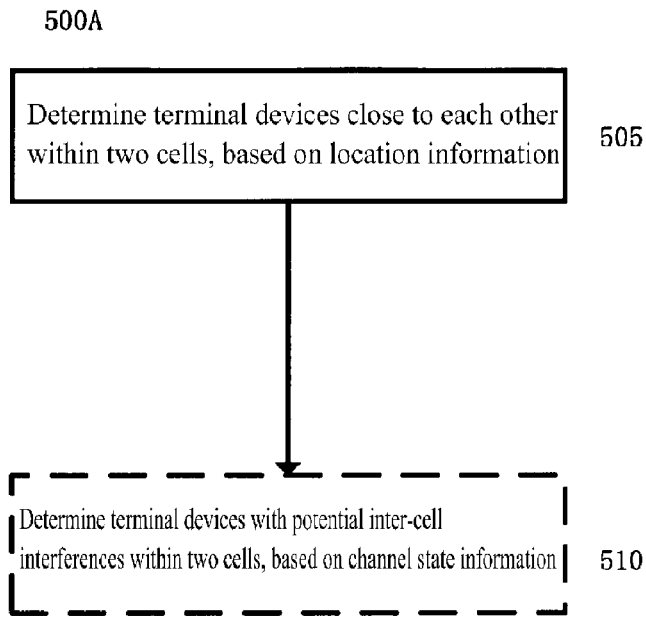
FIG. 5A illustrates an exemplary operation of evaluating potential inter-cell interference, in accordance with an embodiment of the present disclosure.

According to one implementation, in order to resolve or mitigate inter-cell interference problems, potential inter-cell interference can be evaluated to identify terminal devices for which inter-cell interference may exist. The potential inter-cell interference refers to the inter-cell interference will exist if resource multiplexing patterns of the terminal devices in the first and second cells are not completely orthogonal (that is, resources of the terminal device are at least partially overlapped). In one example, potential interferences to the plurality of terminal devices within the first cell caused by the plurality of the terminal devices within the second cell may include potential interferences in the uplink and/or downlink. According to an embodiment of the present disclosure, the electronic device 300A and the electronic device 300B can be further configured to evaluate potential interferences to a plurality of terminal devices within one cell caused by a plurality of terminal devices within another cell, based on the user related information of the plurality of terminal devices within the two cells. FIG. 5A illustrates an exemplary operation of evaluating potential inter-cell interference, in accordance with an embodiment of the present disclosure. Information processing unit A 305 and information processing unit B 355 can both be configured to perform this exemplary operation 500A.

At 505, terminal devices that are close to each other within the two cells can be determined based on the location information of the two cells. As described above, location information can be obtained based on GPS measurements or triangulation and the like. In some examples, two terminal devices located within two cells and within a certain distance range can be considered to be close to each other. The distance can be, for example, any suitable distance such as 1 m, 2 m, 5 m, 10 m, 30 m, etc., as desired. For example, in the example of FIG. 1A, under certain distance criteria, it can be determined that terminal devices that are close to each other are 101A and 101B and 102A and 102B.

At 510, terminal devices with potential inter-cell interference within the two cells can be determined, from the terminal devices that are determined to be close to each other within the two cells, based on the channel state information of the two cells. For terminal devices with better channel conditions, signals related thereto, such as uplink, downlink, or proximity-based services (ProSe) sidelink signals, can be transmitted at a lower power. Therefore, such a terminal device is likely not to cause inter-cell interferences. Accordingly, such terminal devices can be excluded from the terminal devices that are determined to be close to each other within the two cells. For example, in the example of FIG. 1A, terminal devices 102A and 102B may have better channel states. Therefore, it can be considered that only the terminal devices 101A and 101B are terminal devices for which potential inter-cell interference exists. It should be noted that, herein, the criteria of a "good" the channel state measurement can be based on the general principles in the art. Moreover, a pair of terminal devices that are close to each other are excluded only if the pair of terminal devices both have a good channel state. This is because if just one terminal device has a good channel state, the signal transmission and reception of the other terminal device may still cause interferes to it. For example, in the example of FIG. 1A, if just terminal device 102B has a good channel state, then terminal devices 102A and 102B are still considered to be terminal devices with potential inter-cell interference.

In some embodiments, terminal devices with potential inter-cell interferences can be determined based just on operation 505 without performing operation 510. This is because, in general, the location of a terminal device within a cell can largely reflect its channel state vice versa.

Figure 5B:
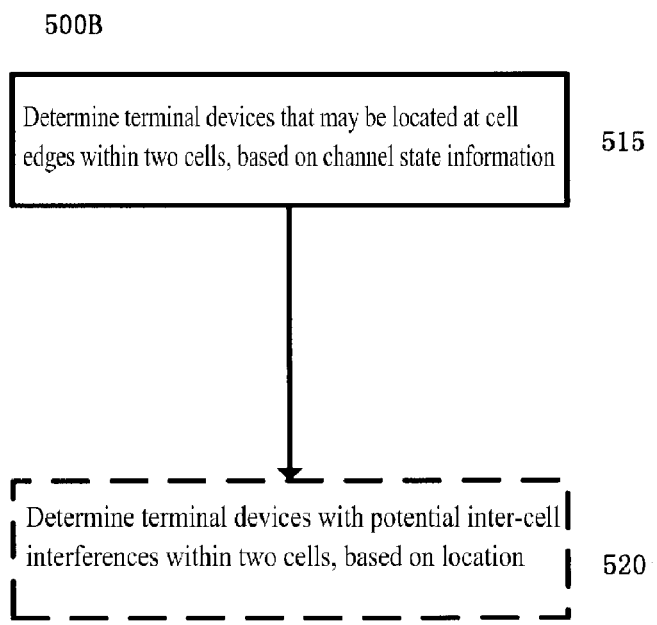
FIG. 5B illustrates another exemplary operation for evaluating potential inter-cell interference, in accordance with an embodiment of the present disclosure.

FIG. 5B illustrates another example operation for evaluating potential inter-cell interference, in accordance with an embodiment of the present disclosure. Information processing unit A 305 and information processing unit B 355 both can be configured to perform this exemplary operation 500B.

At 515, terminal devices that may be located at the cell edge within the two cells can be determined based on channel state information for the two cells. As mentioned above, the quality of a channel state can generally reflect the location of a terminal device within a cell. Therefore, it can be considered that a terminal device with a bad channel state is located at the edge of a cell. For example, in the example of FIG. 1A, it can be determined that the terminal devices 101A, 104A, and 105A are located at the edge of the cell 1, and the terminal devices 101B and 103B are located at the edge of the cell 2.

At 520, terminal devices with potential inter-cell interference within the two cells can be determined based on location information of the two cells. Similar to the operation of 505, it can be considered that two terminal devices located within a certain distance range in two cells are terminal devices with potential inter-cell interferences. Similarly, the distance can be, for example, any suitable distance such as 1 m, 2 m, 5 m, 10 m, 30 m, and the like. For example, in the example of FIG. 1A, under certain distance criteria, it can be determined that terminal devices with potential inter-cell interferences within the two cells are 101A and 101B. In some cases, operation 520 is optional. For example, for the terminal device 103B within the omnidirectional cell 2 in FIG. 1, although it is far from the terminal device 101A, it still causes interferences to the terminal device 101A. Therefore, in this case, the operation 520 may not be performed so as to regard the terminal device 103B as an interfering terminal device as well.

As described with reference to FIG. 5A, FIG. 5B, by evaluating potential inter-cell interferences, terminal devices for which inter-cell interferences may exist within two cells can be determined. In some embodiments, the number of these terminal devices and/or the strength of potential inter-cell interferences can also be determined during the above evaluation of potential inter-cell interferences. For example, the strength of potential inter-cell interference can be determined based on channel state information. In general, communication with a terminal device having a good channel state can be performed with a smaller transmission power, thus it can be determined that the inter-cell interference strength caused by such a terminal device is small; and vice versa. In the case where a number of terminal devices for which inter-cell interference may exist and/or the strength of potential inter-cell interferences is determined, if the number of the terminal devices is larger, the more resource multiplexing pattern may be reserved by the cell 1 for terminal devices within the cell 2 to maintain orthogonality with terminal devices within cell 1; and vice versa. If the potential interferences strength of a certain terminal device within the cell 2 are larger, the resource multiplexing pattern with greater orthogonality may be reserved for it. In this way, inter-cell interferences can be reduced.

After determining potential inter-cell interferences according to the operations illustrated in FIGS. 5A, 5B and any suitable operations, information processing unit A 305 can allocate resource multiplexing pattern for terminal devices within the first cell where potential inter-cell interference exists, as described with reference to embodiments of the present disclosure. If necessary, the information processing unit B 355 can allocate resource multiplexing patterns to terminal devices with potential inter-cell interferences within the second cell based on resource multiplexing pattern information of terminal devices of the first cell after similarly determining potential inter-cell interferences.

According to an embodiment of the present disclosure, after identifying terminal devices for which inter-cell interferences may exist, the inter-cell interference problem can be resolved or mitigated by allocation of a resource multiplexing pattern. The operation of the electronic device 300A to determine the resource multiplexing pattern information will be described below with reference to FIG. 6A in combination with two cases. Wherein, Case 1 is: the two cells each allocates resource multiplexing patterns from the multiple resource multiplexing patterns at the system level to the terminal devices; Case 2: the two cells collectively allocate resource multiplexing patterns from multiple resource multiplexing patterns at the system level to the terminal devices. A special case under case 2 is that a plurality of terminal devices in the two cells can be located in an area where the two cells may have interference with each other, and a set of resources are multiplexed for them with a set of predetermined resource multiplexing patterns at system level.

Figure 6A:
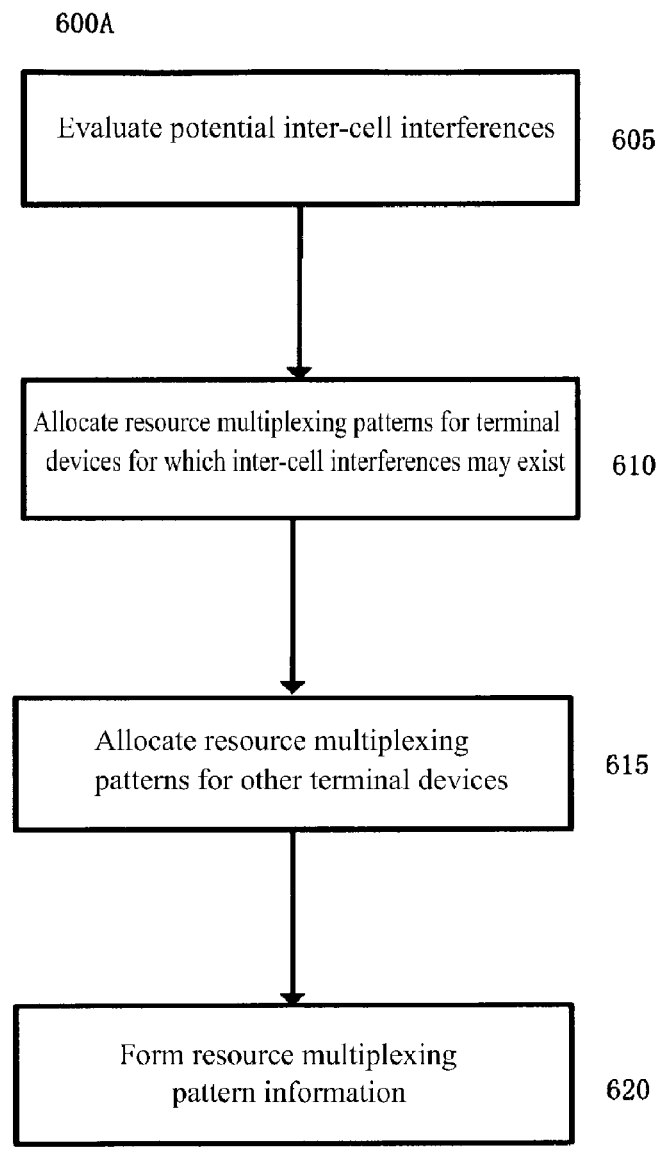
FIGS. 6A and 6B illustrate exemplary operations of determining resource multiplexing pattern information, in accordance with an embodiment of the present disclosure.

As illustrated in FIG. 6A, at 605, electronic device 300A (e.g., information processing unit A 305) can be configured to evaluate potential inter-cell interference (e.g., can be in accordance with the methods of the present disclosure or any other suitable method), thereby identifying terminal devices for which inter-cell interferences may exist, such as terminal devices 101A and 101B, as well as 102A and 102B. At 605, the number of terminal devices for which potential inter-cell interferences exist and/or the strength of potential inter-cell interferences can also be determined. In some embodiments, it may be determined that there are, for example, 2 terminal devices within the second cell that may cause potential inter-cell interferences, and/or the strength of potential inter-cell interferences caused by the terminal device 101B is greater.

At 610, electronic device 300A (e.g., information processing unit A 305) can be configured to allocate a resource multiplexing pattern for the identified terminal devices for which inter-cell interferences may exist. In some embodiments, the allocation operation 610 may be such that the orthogonality of the resource multiplexing patterns allocated for these terminal devices is smaller (it may be understood that the orthogonality is less than a certain threshold or less than that of when the resource multiplexing pattern is randomly allocated). One objective of the allocation operation 610 can be to reserve resource multiplexing patterns for terminal devices (e.g., terminal devices 101B and 102B) in a neighboring second cell for which potential interferences exist, such that the orthogonality of resource multiplexing patterns of the terminal devices within two cells within the potential inter-cell interference area is large (which may be understood that the orthogonality is larger than a certain threshold or larger than that of when the resource multiplexing pattern is randomly allocated). In an example, the larger the above-mentioned potential inter-cell interferences are (for example, the larger the number of terminal devices in the second cell that may cause potential inter-cell interferences is), the more dedicated resources or resource multiplexing patterns can be reserved for the plurality of terminal devices within the second cell to maintain orthogonality with the plurality of terminal devices in the first cell. In one example, the larger the potential inter-cell interference strength that can be caused by a certain terminal device (for example, the terminal device 101B) within the second cell, the resource or resource multiplexing patterns with larger orthogonality can be reserved for it. As mentioned earlier, the orthogonality between resource multiplexing patterns can be reflected by the correlation. For example, for the factor graph vector in the SCMA system, the correlation between the vector $[0011]^T$ and the vector $[1100]^T$ is 0, which has complete orthogonality; the correlation between the vector $[0011]^T$ and the vector $[0011]^T$ is 1, which has no orthogonality at all; there is certain correlation between the vector $[0011]^T$ and the vector $[0101]^T$, which has incomplete orthogonality.

At 615, electronic device 300A (e.g., information processing unit A 305) can be configured to allocate resource multiplexing patterns for other terminal devices. In some embodiments, allocation operations 610 and 615 can take into account the priorities of terminal devices, thereby prioritizing the performance of terminal devices with high priorities. For example, in a case where a plurality of terminal devices within a first cell have higher priorities than a plurality of terminal devices in a second cell, the electronic device 300A can prioritize performance of resources allocated to the plurality of terminal devices within the first cell (for example, to allocate channels with better channel conditions, etc.). In one embodiment, the priority of a terminal device can be considered to correspond to the priority of the service type of the terminal device. The priority of the service type can be determined in any manner in the art. For example, it can be considered that the priorities of real-time services such as packet voice and video services are higher than that of web browsing, and the priority of emergency call service is higher than those of general services.

At 620, electronic device 300A (e.g., information processing unit A 305) can be configured to form resource multiplexing pattern information for the first cell based on the results of allocation operations 610 and 615. In the foregoing case 1, the resource multiplexing pattern information can be of a specific form as desired. In one example, the resource multiplexing pattern information can include correspondences between all terminal devices in a cell and corresponding resource multiplexing patterns (denoted as Form 1). In one example, the resource multiplexing pattern information can include only correspondences between terminal devices for which inter-cell interference may exist in a cell and corresponding resource multiplexing patterns (denoted as Form 2). In one example, the resource multiplexing pattern information can include resource multiplexing patterns allocated for terminal devices for which inter-cell interferences may exist in the cell, without indicating a correspondence with terminal devices (denoted as Form 3). In the foregoing case 2, since two cells share multiple resource multiplexing patterns at the system level, the resource multiplexing pattern information should include the correspondence between all terminal devices in the cell and the corresponding resource multiplexing patterns (also as Form 1) for neighboring cell to identify unallocated resource multiplexing patterns and resource multiplexing patterns allocated for terminal devices for which inter-cell interference may exist. In some cases, the resource multiplexing pattern information can also indicate information of terminal devices having potential inter-cell interference in neighboring cells (e.g., terminal devices 101A and 101B, and 102A and 102B), In this way, the electronic device 300B may not need to evaluate the potential inter-cell interference by itself, and instead directly identify terminal devices having potential inter-cell interference within the second cell by using the information.

The operation of determining the resource multiplexing pattern information by the electronic device 300B will be described below with reference to FIG. 6B in conjunction with the above two cases.

Figure 6B:
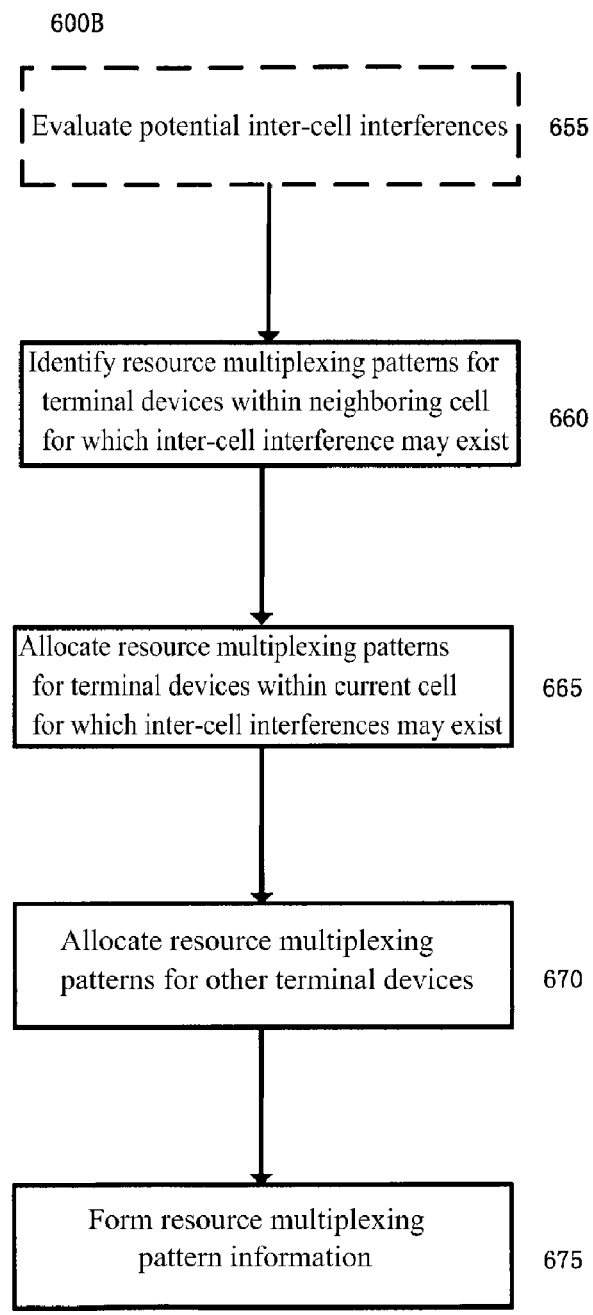

As illustrated in FIG. 6B, at 655, electronic device 300B (e.g., information processing unit B 355) can be configured to evaluate potential inter-cell interferences (e.g., can be in accordance with the methods of the present disclosure or any other suitable method), thereby identifying terminal devices for which inter-cell interference may exist (e.g., terminal devices 101A and 101B, as well as 102A and 102B). In some embodiments, the evaluation operation 655 is optional. For example, in a case where the resource multiplexing pattern information obtained from the electronic device 300A may indicate that the terminal devices 101A and 101B as well as 102A and 102B have potential inter-cell interferences, terminal devices for which inter-cell interferences may exist can be directly identified based on the resource pattern multiplexing information. Similar to operations of FIG. 6A, at 655, the number of terminal devices for which potential inter-cell interferences may exist and/or the strength of potential inter-cell interference may also be determined. For example, it may be similarly determined that there are, for example, two terminal devices in the second cell that may cause potential inter-cell interferences, and/or that the strength of potential inter-cell interferences caused by the terminal device 101B is larger.

At 660, electronic device 300B (e.g., information processing unit B 355) can be configured to identify resource multiplexing patterns for neighboring cell terminal devices (e.g., terminal devices 101A and 102A) for which inter-cell interference may exist. The resource multiplexing patterns can be the resource multiplexing patterns with smaller orthogonality allocated by the electronic device 300A as mentioned above. In the case where the resource multiplexing pattern information is Form 1 or Form 2, the resource multiplexing patterns for neighboring cell terminal devices for which inter-cell interferences may exist can be determined based on the identified neighboring cell terminal devices (e.g., terminal devices 101A and 102A) for which inter-cell interference may exist and the correspondence included in the resource multiplexing pattern information. In the case that the resource multiplexing pattern information is the Form 3, the resource multiplexing patterns for neighboring cell terminal devices for which inter-cell interferences may exist can be directly determined based on the resource multiplexing pattern information.

At 665, electronic device 300B (e.g., information processing unit B 355) can be configured to allocate resource multiplexing patterns for the identified terminal devices (e.g., terminal devices 101B and 102B) for which inter-cell interferences may exist. In some embodiments, the allocation operation 665 may occupy resources not occupied by the plurality of terminal devices in the first cell firstly, to maintain larger orthogonality between resource multiplexing patterns of the terminal devices within both cells. In one embodiment, since the allocation operation 610 has reserved a resource multiplexing pattern for a terminal device having potential interferences in a neighboring cell, the orthogonality of the resource multiplexing patterns of terminal devices (e.g., the terminal device 101A and 101B as well as 102A and 102B) within the two cells in the potential inter-cell interference area can be made larger. In one example, since the potential inter-cell interference strength that can be caused by the terminal device 101B is larger, and the first cell has reserved a resource multiplexing pattern with a larger orthogonality for this terminal device, the terminal device 101B can be allocated firstly the reserved resource multiplexing patterns, thereby inter-cell interferences that could be caused by the terminal device 101B are reduced.

At 670, electronic device 300B (e.g., information processing unit B 355) can be configured to allocate resource multiplexing patterns for other terminal devices. In some embodiments, the allocation operation 670 can also occupy resources not occupied by the plurality of terminal devices in the first cell firstly, to maintain larger orthogonality between resource multiplexing patterns of the terminal devices within both cells.

At 675, electronic device 300B (e.g., information processing unit B 355) can be configured to form resource multiplexing pattern information for the second cell based on the results of allocation operations 665 and 670.

Example operations for determining resource multiplexing pattern information in different multiple access systems in accordance with embodiments of the present disclosure are described in detail below in reference to FIGS. 7-9.

SCMA System Example

An example for determining resource multiplexing pattern information of terminal devices in an SCMA system is first described. Assuming that the wireless communication system in FIG. 1A is an SCMA system, cell 1 and cell 2 reuse identical spectrum resources. The number of available time-frequency resources in the cell 1 and the cell 2 is K=5, and the number of resources required by each terminal device is N=2, accordingly, each cell can support up to 10 terminal devices. For convenience, taken the number of terminal devices in the two cells in FIG. 1A, $J_1=6$, $J_2=4$ here as example to describe. In an SCMA system, a transmitting end (a base station or a terminal device) first modulates binary bit information into N-dimensional constellation symbols by an encoding operation, and converts N-dimensional constellation symbols into sparse K-dimensional codewords through a mapping matrix. In the SCMA system, the mapping matrix and the N-dimensional constellation can be referred to as a codebook. A mapping matrix for a plurality of terminal devices can generally have a form of factor graph representation. It is assumed that both cell 1 and cell 2 use a factor graph matrix F as illustrated in FIG. 7, wherein each row in the factor graph matrix F corresponds to one of five resource nodes (denoted as resource nodes a to e), and each column corresponds to one of the plurality of terminal devices, the i-th row and the j-th column element is 1 indicating that the corresponding constellation of the terminal device j occupies the resource i, and the i-th row and the j-th column element is 0, indicating that the terminal device j does not occupy the resource i. In the SCMA system, the codebook can be considered to specify multiple resource multiplexing patterns at the system level. The vector and constellation in the factor graph matrix can be considered as the resource multiplexing pattern allocated to each terminal device. This kind of allocation forms resource multiplexing pattern information.

An exemplary process for determining resource multiplexing pattern information for cell 1 and cell 2 under the above case 1 (i.e., cell 1 and cell each allocating a factor graph vector to a terminal device through a factor graph matrix F) is described in conjunction with FIG. 7A. For cell 1, electronic device 300A can evaluate potential inter-cell interference between the terminal devices within cell 1 and the terminal devices within cell 2, such as by operations of FIG. 4A or FIG. 4B. In an example, electronic device 300A can determine that it is terminal devices 101A and 101B as well as 102A and 102B for which potential inter-cell interferences exist. In yet another example, the electronic device 300A can determine that the potential inter-cell interference caused by the terminal device 101B is greater, as compared to the terminal device 102B. At this time, the electronic device 300A can reserve a factor map vector for the terminal devices 101B and 102B within the cell 2 to maintain the orthogonality of the resource/factor graph vectors between the terminal devices 101A and 101B, as well as 102A and 102B. In the factor graph matrix F of FIG. 7A, the correlation of $f_1$ and $f_{10}$ is 0, and there is no resource node overlap in the resource node allocations represented by them, and thus have complete orthogonality. And $f_1$ and $f_2$ have certain correlation, and there are partial resource nodes overlap in the resource multiplexing pattern represented by them, and thus have incomplete orthogonality. Each factor graph vector is completely non-orthogonal to itself. For example, the factor map vector may be allocated to the terminal devices 101A and 102A only from the factor graph vector $f_5$ to $f_{10}$, that is, at least the factor map vector $f_1$ to $f_4$ are reserved for terminal devices 101B and 102B. In the SCMA system, the orthogonality between the allocated and reserved factor graph vectors can be guaranteed by reserving resource nodes. For example, the reservation factor graph vector $f_1$ to $f_4$ can be understood to reserve at least the resource node a for the terminal devices 101B and 102B, so that the orthogonality of resource/factor graph vectors between the terminal devices 101A and 101B, and 102A and 102B can be ensured to some extent. The larger the number of terminal devices in the cell 2 with potential inter-cell interferences is, the more resource multiplexing patterns may be reserved for the interfering terminal devices in the cell 2 for maintaining resources orthogonality. For example, when it is determined that there are more terminal devices with potential inter-cell interferences, the factor map vector may be allocated only from the factor map vectors $f_8$ to $f_{10}$ to terminal devices 101A and 102A, i.e., at least the factor map vectors $f_1$ to $f_7$ are reserved for these interference terminal devices. In the example of FIG. 7A, the factor map vectors allocated to the terminal devices 101A and 102A are $f_9$ and $f_{10}$. At this time, it can be understood that the factor map vector $f_1$, which is completely orthogonal (i.e., the maximum orthogonality) to factor map vectors $f_9$ and $f_{10}$, is reserved to the terminal device 101B within the cell 2 that may cause greater potential inter-cell interferences.

For the terminal devices 103A to 106A, they can be allocated to any of factor graph vectors $f_1$ to $f_8$. In the example of FIG. 7A, factor graph vectors $f_5$ to $f_8$ are allocated to them. This allocation method reserves a factor map vector $f_1$ to $f_4$ for the cell 2 to maintain a certain orthogonality with the factor map vector allocated by the cell 2. The constellation can be allocated to the terminal devices within cell 1 in any suitable manner. After the factor map vector and the constellation are allocated, then resource multiplexing pattern information of each terminal device within the cell 1 is formed. The resource multiplexing pattern information can be any of the aforementioned Form 1 to Form 3. That is to say, in one example, the resource multiplexing pattern information can include correspondences between the terminal devices 101A to 106A and the allocated factor map vectors and constellations. In one example, the resource multiplexing pattern information can include correspondences between the terminal devices 101A, 102A and the allocated factor map vectors and constellations. In one example, the resource multiplexing pattern information may include factor map vectors and constellations allocated to the terminal devices 101A, 102A without indicating correspondences with the terminal devices. In addition, in one example, the resource multiplexing pattern information can indicate that terminal devices having potential inter-cell interferences between cell 1 and cell 2 are 101A and 101B as well as 102A and 102B.

For cell 2, electronic device 300B can also evaluate potential inter-cell interferences of the terminal device within cell 2 and the terminal device within cell 1, for example by operations of FIG. 4A or FIG. 4B. In some embodiments, the electronic device 300B can even identify terminal devices for which inter-cell interference may exist based on the resource multiplexing pattern information received from the electronic device 300A. In one example, electronic device 300B can likewise determine that the terminal devices having potential inter-cell interferences are terminal devices 101A and 101B, as well as 102A and 102B. In yet another example, the electronic device 300B can determine that the potential inter-cell interference caused by the terminal device 101B is greater, as compared to the terminal device 102B. At this time, the electronic device 300B can determine the factor map vectors and the constellation that have been allocated to the terminal devices 101A to 106A based on the various forms of resource multiplexing pattern information of the cell 1. According to the different forms of the resource multiplexing pattern information, the electronic device 300B can, for example, determine a factor map vector and a constellation allocated to the terminal devices 101A to 106A and their correspondence with the terminal devices, or can determine a factor map vector and a constellation allocated to the terminal devices 101A, 102A and their correspondence with the terminal devices, or can determine only the factor map vector and the constellation allocated for the terminal device 101A, 102A. For example, the electronic device 300B can determine that the factor map vector allocated to the terminal devices 101A, 102A is $f_9$ and $f_{10}$.

Next, based on factor map vectors and constellations allocated to the terminal devices 101A, 102A within the cell 1 with potential interference, the factor map vectors and the constellations can be allocated to the terminal devices 101B, 102B within the cell 2 with potential interference to maintain the orthogonality of the factor graph vector as large as possible. For example, in FIG. 7A, factor map vectors $f_1$ and $f_2$ are allocated to the terminal devices 101B, 102B. In one example, since it is determined that the terminal device 101B causes larger potential inter-cell interference, the factor map vector $f_1$, which is completely orthogonal (i.e., the most orthogonal) to factor map vectors $f_9$ and $f_{10}$ is allocated to the terminal device 101B.

For terminal devices 103B to 104B, any of factor graph vectors $f_3$ to $f_{10}$ can be allocated to them. In the example of FIG. 7A, factor graph vectors $f_3$ to $f_4$ are allocated to them. This allocation method maintains a certain orthogonality of the factor map vectors allocated by the two cells. The constellation can be allocated to the terminal devices within cell 2 in any suitable manner. After the factor map vector and the constellation are allocated, then resource multiplexing pattern information of each terminal device within the cell 2 is formed.

The maintaining of orthogonality between factor graph vectors of different terminal devices is described above. In some embodiments, due to the large number of terminal devices accessing to the system, a single factor map vector is very likely to be allocated to two terminal devices of cell 1 and cell 2 for common use. At this time, in order to reduce inter-cell interferences, the two terminal devices can be allocated as dissimilar constellations as possible to ensure the orthogonality of resource multiplexing patterns from the perspective of the constellation.

An exemplary process for determining resource multiplexing pattern information for cell 1 and cell 2 under the above case 2 (i.e., cell 1 and cell collectively allocating factor graph vectors to terminal devices through a factor graph matrix F) is described in conjunction with FIG. 7B, For cell 1, electronic device 300A can similarly determine that it is terminal devices 101A and 101B as well as 102A and 102B for which potential inter-cell interferences exist, and/or can determine that the potential inter-cell interference caused by the terminal device 101B is greater, as compared to the terminal device 102B. The electronic device 300A can reserve factor map vectors for the terminal devices 101B and 102B within the cell 2 to maintain the orthogonality of the resource/factor graph vectors between the terminal devices 101A and 101B, as well as 102A and 102B. Here, similar to the example of FIG. 7A, factor map vectors allocated to terminal devices 101A and 102A are $f_9$ and $f_{10}$.

For the terminal devices 103A to 106A, allocating factor map vectors for them may aim to maintain a certain orthogonality of the factor map vectors allocated for the two cells as much as possible. Therefore, in the example of FIG. 7B, factor map vectors $f_5$ to $f_8$ are allocated to them. The constellation can be allocated to the terminal devices within cell 1 in any suitable manner. After the factor map vector and the constellation are allocated, then resource multiplexing pattern information of each terminal device within the cell 1 is formed. The resource multiplexing pattern information can include correspondences between the terminal devices 101A and 106A and the allocated factor map vectors and constellations, so that the electronic device 300B identifies factor map vectors and constellations that are available for allocation. Also, in one example, the resource multiplexing pattern information can indicate that terminal devices having potential inter-cell interferences between cell 1 and cell 2 are 101A and 101B as well as 102A and 102B.

For cell 2, electronic device 300B can also determine that it is terminal devices 101A and 101B, as well as 102A and 102B for which potential inter-cell interferences exist, and/or can determine that the potential inter-cell interferences caused by terminal device 101E is larger, compared to terminal device 102B. At this time, the electronic device 300B can determine the factor map vector and the constellation that have been allocated to the terminal devices 101A to 106A and their correspondence with the terminal devices based on the resource multiplexing pattern information of the cell 1. At this time, in the example of FIG. 7B, the electronic device 300B can determine that the unallocated factor map vectors are $f_1$ to $f_4$.

Next, based on factor map vectors and constellations allocated to the terminal devices 101A, 102A within the cell 1 with potential interference, the factor map vectors and the constellations can be allocated to the terminal devices 101B, 102B within the cell 2 with potential interference to maintain the orthogonality of the factor graph vector as large as possible. For example, in FIG. 7B, likewise, factor map vectors $f_1$ and $f_2$ are allocated to the terminal devices 101B, 102B. In one example, since it is determined that the terminal device 101B causes larger potential inter-cell interference, the factor map vector which is completely orthogonal (i.e., the most orthogonal) to factor map vectors $f_1$ and $f_{10}$, is allocated to the terminal device 101B. For the terminal devices 103B to 104B, only factor map vectors $f_3$ and $f_4$ can be allocated to them. The constellation can be allocated to the terminal devices within cell 2 in any suitable manner. After the factor map vector and the constellation are allocated, then resource multiplexing pattern information of each terminal device within the cell 2 is formed.

The above describes the case where spectrum resources reused by cell 1 and cell 2 in a SCMA system are identical. The above ideas and principles are equally applicable to the case where spectrum resources reused by cell 1 and cell 2 are not identical. In this case, as illustrated in FIG. 8, the factor graph matrix of the cell 1 and the cell 2 is still F, and the rows of the factor graph matrix of the cell 1 correspond to the resource nodes a to e in sequence in accordance with the configuration 1 in FIG. 8, while the rows of the factor graph matrix of the cell 2 correspond to resource nodes a1 and b to e in sequence in accordance with the configuration 2 in FIG. 8. At this time, it can be considered that the judging object of the resource multiplexing pattern orthogonality is a vector formed by the rows corresponding to the common resource nodes b to e in the factor graph matrix F (as indicated by a dash line in FIG. 8). The above ideas and principles are still applicable to the vectors thus formed, and the description thereof will not be repeated.

In some embodiments, electronic device 300A can determine that a terminal device in cell 1 has a higher priority based on user related information for cell 1 and cell 2. The determination of the priority can be based, for example, on the type of service or the like. In this case, the electronic device 300A can prioritize performance of resources allocated to a plurality of terminal devices within cell 1. For example, for the terminal device 101A, if the channel states on the resource nodes c and d are good, this terminal device can be preferentially allocated a factor graph vector $f_8$.

PDMA System Example

Next, an example for determining resource multiplexing pattern information of a terminal device in a PDMA system is described.

PDMA is a non-orthogonal multiple access method that can be applied simultaneously or selectively in the power domain, code domain, space domain, frequency domain, and time domain. PDMA can superimpose user signals of different signal powers on the basis of time-frequency resource units, such as superimposing user signals allocated on different antenna port numbers and spreading codes, and expressing the resource units of these different signals with feature patterns collectively. Taking a PDMA system with 4 resource units as an example, with the pattern matrix G as illustrated in FIG. 9, the system can support up to 8 terminal devices. In a PDMA system, the pattern matrix can be considered to specify multiple resource multiplexing patterns at the system level, and the vector in the pattern matrix can be considered as the resource multiplexing pattern allocated to each terminal device, and this kind of allocation forms the resource multiplexing pattern information.

It is assumed that the wireless communication system in FIG. 1A is a PDMA system. In some embodiments, the resource multiplexing pattern information of cell 1 and cell 2 can be determined according to the following manner, to reduce inter-cell interferences. Similar to the example of a SCMA system, for cell 1, the electronic device 300A can determine that it is terminal devices 101A and 101B, as well as 102A and 102B for which potential inter-cell interferences exist. At this time, the electronic device 300A can reserve resource multiplexing patterns (i.e., pattern matrix vectors) for the terminal devices 101B and 102B within the cell 2 to maintain the orthogonality of the resource multiplexing patterns between the terminal devices for which potential inter-cell interferences exist. In one example, the orthogonality between the resource multiplexing patterns of the terminal devices 101A and 102A can be made smaller, for example, the vectors $g_7=[0011]^T$ and $g_8=[0001]^T$ of the pattern matrices are allocated to the terminal devices 101A and 102A, respectively. At this time, the resources occupied by the terminal devices 101A and 102A are $[0011]^T$, that is, only the last two resources are occupied. Similar to the example of a SCMA system, the larger the above potential interference is, the more resource multiplexing patterns can be reserved for the terminal devices 101B and 102B within cell 2 for maintaining resource orthogonality.

For cell 2, electronic device 300B can also determine that it is terminal devices 101A and 101B, as well as 102A and 102B for which potential inter-cell interferences exist. At this time, the electronic device 300B can determine resource multiplexing patterns for terminal devices of cell 2 based on the resource multiplexing pattern information of cell 1. For example, the electronic device 300B can determine resource multiplexing patterns of terminal devices 101A and 102A based on the resource multiplexing pattern information of cell 1, and in turn can preferentially allocate the resource multiplexing patterns for terminal devices 101B and 102B that are as orthogonal as possible to the resource multiplexing patterns for terminal devices 101A and 102A, for example, the electronic device 300B can preferentially allocate vectors $g_1$ and $g_2$ (vectors that are orthogonal to $g_7$ and $g_8$ or have high orthogonality) to the terminal devices 101B and 102B. In one example, electronic device 300B can determine that potential inter-cell interferences that could be caused by terminal device 101B are greater, compared to terminal device 102B. At this time, the electronic device 300B can allocate a vector $g_2$, which is completely orthogonal to vectors $g_7$ and $g_8$, to the terminal device 101B, thereby reducing inter-cell interferences.

IDMA System Example

Next, an example for determining resource multiplexing pattern information of a terminal device in an IDMA system is described.

The IDMA system employs different interleavers to distinguish between different data streams. In general, operating parameters of an interleaver in a transmitting apparatus can be determined based on channel state information. Here, operating parameters of an interleaver can include identification information characterizing the interleaver. The identification information can optionally indicate the type of interleaver which is configured in the transmitting apparatus, wherein the type of interleaver includes orthogonal interleaver and random interleaver. For orthogonal interleaver, the construction sequences used between different interleavers are orthogonal to each other. For random interleaver, the construction sequences used between different interleavers are obtained by a specific random algorithm, and these construction sequences are not necessarily orthogonal. For example, the identification information can employ a specific number or character to represent the orthogonal interleaver, while a different number or character to represent the random interleaver.

In an IDMA system, there can be no interference between any two terminal devices using different orthogonal interleavers, and there can be interferences between any two terminal devices using non-orthogonal interleavers or between one terminal device using an orthogonal interleaver and one terminal device using a non-orthogonal interleaver. In the IDMA system, it can be considered that various orthogonal interleavers and non-orthogonal interleavers collectively specify multiple resource multiplexing patterns at the system level, and each interleaver (represented by identification information) can be considered as a resource multiplexing pattern being allocated to each terminal device. This kind of allocation forms the resource multiplexing pattern information.

Assuming that the wireless communication system in FIG. 1A is an IDMA system. In some embodiments, the resource multiplexing pattern information of cell 1 and cell 2 can be determined according to the following manner, to reduce inter-cell interferences. Similar to the example of a SCMA system, for cell 1, the electronic device 300A can determine that it is the terminal devices 101A and 101B, as well as 102A and 102B for which potential inter-cell interferences exist. At this time, the electronic device 300A can reserve resource multiplexing patterns (i.e., an interleaver) for terminal devices 101B and 102B within cell 2 to maintain the orthogonality of resource multiplexing patterns between the terminal devices for which potential inter-cell interferences exist. In one example, the orthogonality between resource multiplexing patterns of terminal devices 101A and 102A can be made smaller, for example, the non-orthogonal interleaver is allocated to the terminal devices 101A and 102A. Similar to the example of a SCMA system, the larger the above potential interference is, the more resource multiplexing patterns can be reserved for the terminal devices 101E and 102B in cell 2 for maintaining resource orthogonality.

For cell 2, electronic device 300B can also determine that it is terminal devices 101A and 101B, as well as 102A and 102B for which potential inter-cell interferences exist. At this time, the electronic device 300B can determine the resource multiplexing patterns for terminal devices of cell 2 based on the resource multiplexing pattern information of cell 1. For example, the electronic device 300B can determine the interleaver allocated to the terminal devices 101A and 102A based on the resource multiplexing pattern information of cell 1, and in turn can preferentially allocate the interleavers for the terminal device allocations 101B and 102B that are as orthogonal as possible with the interleavers of terminal devices 101A and 102A, for example, the electronic device 300B can preferentially allocate orthogonal interleavers to the terminal devices 101B and 102B.

Example operations for determining resource multiplexing pattern information of a terminal device is described above with reference to neighboring cell 1 and cell 2. As mentioned previously, these operations are equally applicable to cells formed by beamforming.

Resource Multiplexing Pattern Information Sharing

In foregoing embodiments, it is described that the electronic device 300B can, based on the resource multiplexing pattern information of terminal devices of a first cell, determine the resource multiplexing pattern information of terminal devices within a served second cell. Such sharing resource multiplexing pattern information between electronic devices having control functions can reduce potential inter-cell interferences by increasing resources resource multiplexing patterns) orthogonality. Embodiments in which resource multiplexing pattern information is shared between such electronic devices to facilitate mobility management are described below.

Figure 10:
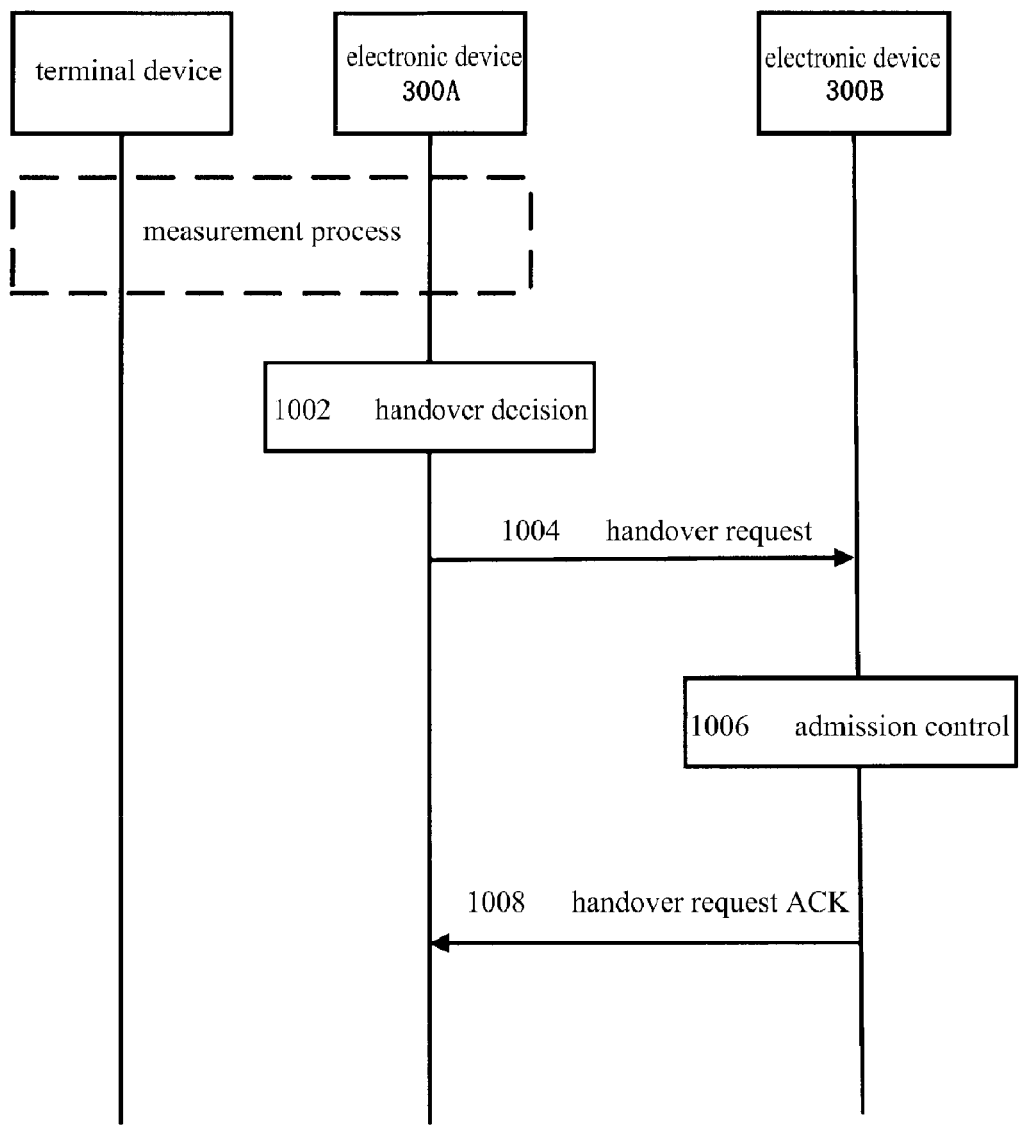
FIG. 10 illustrates an exemplary operation of handover preparation in accordance with an embodiment of the present disclosure.

FIG. 10 illustrates an exemplary operation of handover preparation in accordance with an embodiment of the present disclosure. In FIG. 10, the electronic device 300A can correspond to a source base station, and the electronic device 300B can correspond to a target base station, and a terminal device is handed over from the source base station to the target base station by this exemplary operation. In order to prepare for the handover, the electronic device 300A needs to perform measurement configuration on the terminal device during the measurement process. The terminal device needs to report the measurement result according to the measurement configuration to assist the electronic device 300A in making the handover decision. Next, at 1002, the electronic device 300A can refer to the measurement report result of the terminal device, and make handover decision according to a handover algorithm. At 1004, electronic device 300A can send a handover request message to electronic device 300B, which may include handover preparation related message. In one embodiment, the message may further include resource multiplexing pattern information of terminal devices within a first cell served by the electronic device 300A, where the resource multiplexing pattern information should include the correspondence between the terminal device and the resource multiplexing pattern. At 1006, the electronic device 300B can perform admission control according to the handover preparation related message to improve the success rate of the handover. At 1008, the electronic device 300B can perform layer 1/layer 2 handover preparations, meanwhile transmitting a handover request ACK message to the electronic device 300A. After the above handover preparation operation is completed, the electronic devices 300A and 300B can perform handover according to any suitable operation, such as those known in the art. In various embodiments, signaling can be transmitted between electronic device 300A and electronic device 3003 via an interface (wired or wireless) between them.

In the case 1 mentioned above (i.e., two cells each allocating a resource multiplexing pattern from a plurality of resource multiplexing patterns at the system level to terminal devices), a plurality of terminal devices within the first cell is a particular set of terminal devices which multiplex resources with a set of predetermined patterns. At this time, the first electronic device 300A informing the second electronic device 300B of the determined resource multiplexing pattern information can include informing the second electronic device 300B of the resource multiplexing pattern information for the particular set of terminal devices during the handover preparation process, such that the particular set of terminal devices will be served by the second electronic device 300B by using the informed resource multiplexing pattern information after the particular set of terminal devices are handovered from the first cell to the second cell. In this embodiment, the resource multiplexing pattern information should include a correspondence between the terminal devices and the resource multiplexing patterns. In this way, the second electronic device 300B does not need to allocate and notify the terminal devices of the allocated resource multiplexing pattern for the handovered terminal devices, thereby saving computation and signaling overhead. In particular, the above operation can reduce the handover loss for the case where there is an unfinished data transmission between the first electronic device 300A and the terminal device during the handover. Of course, for the new data to be transmitted through the second electronic device 300B, the resource multiplexing pattern can also be reallocated according to the situation of the second cell to optimize system performance. In some embodiments, considering that the electronic device 300A might have previously notified the electronic device 300B of the resource multiplexing pattern information when allocating the resource multiplexing patterns, it may not be necessary to notify the related resource multiplexing pattern information during the handover preparation process.

In the case 2 mentioned above (i.e., two cells collectively allocate resource multiplexing patterns from multiple resource multiplexing patterns at the system level to terminal devices), a plurality of terminal devices within two cells multiplex resources with a set of predetermined patterns. According to the previous embodiment, in order to avoid or mitigate inter-cell interferences, it can be considered that the two cells has coordinated the allocation of the resource multiplexing patterns. In some embodiments, the electronic device 300A can notify the electronic device 300B of the resource multiplexing pattern information when allocating the resource multiplexing pattern, or the electronic device 300A can notify the electronic device 300B of the resource multiplexing pattern information during the handover preparation process, and the resource multiplexing pattern information includes a correspondence between the terminal devices and the resource multiplexing pattern. Due to the previous coordination of the resource multiplexing patterns, the second electronic device 300B can use the informed resource multiplexing pattern information for the terminal device to serve the terminal device after any one of the plurality of terminal devices is handovered from the first cell to the second cell.

As is known, dual connectivity is a technology that enables a terminal device to communicate with a plurality of base stations, thereby increasing the data rate. For example, the terminal device can maintain a connection with both the first base station and the second base station. The first base station can be referred to as a master base station (e.g., MeNB in LTE), and the second base station can be referred to as a secondary base station SeNB in LTE). In the process of a base station communicating with the terminal device, another base station can be added to form a dual connection as needed (for example, increased data rate is desired), then the original base station becomes the primary base station, and the added base station becomes the secondary base station. In some cases, the master base station can be a macro base station, the secondary base station can be a micro base station, and in some cases, the micro base station can be located within the coverage of the master base station. According to an embodiment of the present disclosure, the adding operation can be implemented by a base station addition operation as follows.

Figure 11:
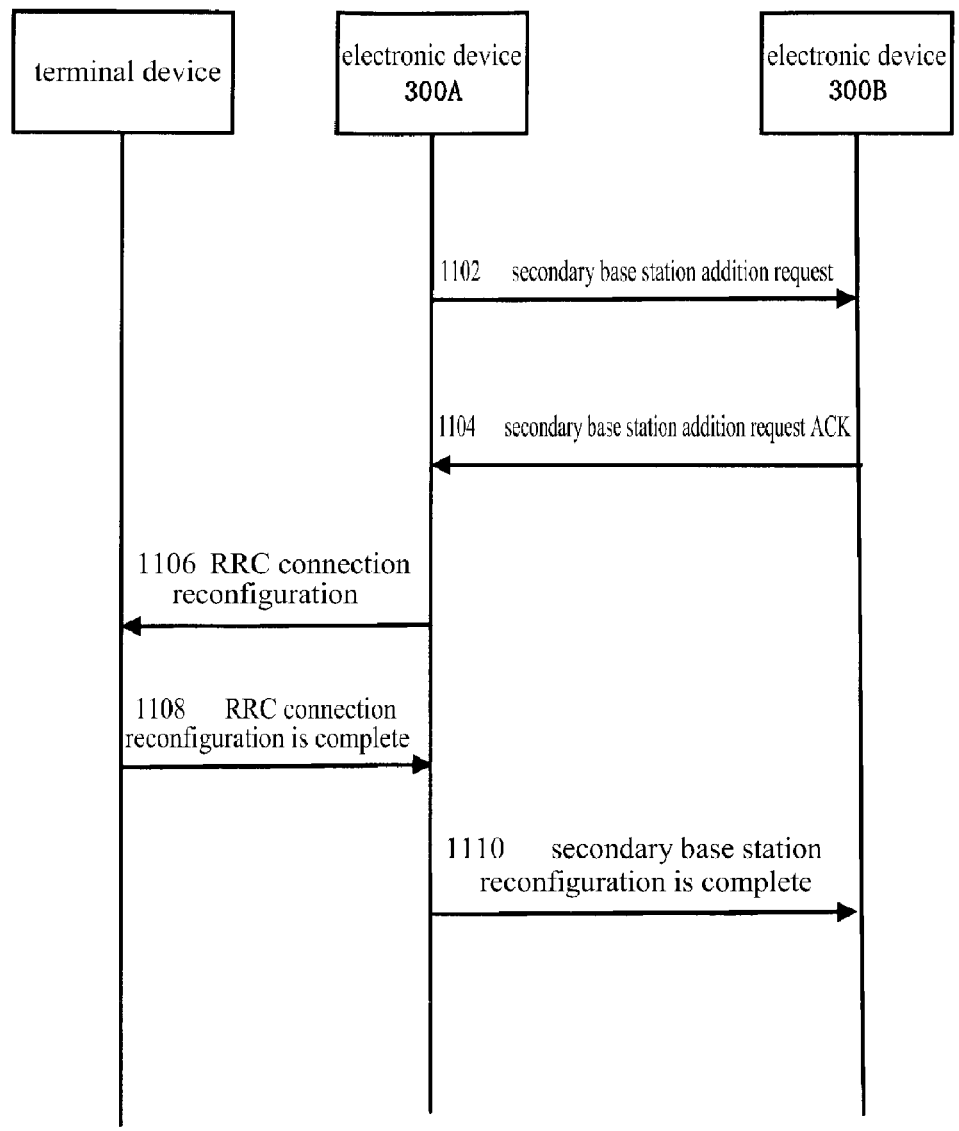
FIG. 11 illustrates an exemplary operation of adding a secondary base station in accordance with an embodiment of the present disclosure.

FIG. 11 illustrates exemplary operations of secondary base station addition in accordance with an embodiment of the present disclosure. In FIG. 11, the electronic device 300A can correspond to a master base station, and the electronic device 300B can correspond to a secondary base station, by these exemplary operations, the terminal device forms dual connection with the electronic devices 300A and 300B. At 1102, the electronic device 300A can transmit a secondary base station addition request message to the electronic device 300B, to request the electronic device 300B to allocate radio resources for communicating with the terminal device. In one embodiment, the request message can include the resource multiplexing pattern information for the terminal devices of the first cell served by the electronic device 300A, where the resource multiplexing pattern information includes the correspondence between the terminal device and the resource multiplexing pattern. At 1104, the electronic device 300B can allocate corresponding resources and send a base station addition request ACK to the electronic device 300A upon the radio resource management entity grants the resource request. At 1106, the electronic device 300A can instruct the terminal device to perform RRC connection reconfiguration. At 1108, the terminal device can indicate to the electronic device 300A that the RRC connection reconfiguration is complete. At 1110, the electronic device 300A can indicate to the electronic device 300B that the secondary base station reconfiguration is complete. In various embodiments, signaling can be transmitted between electronic device 300A and electronic device 300B via an interface (wired or wireless) between them. In some embodiments, considering that the electronic device 300A might have previously notified the electronic device 300B of the resource multiplexing pattern information when allocating the resource multiplexing pattern, it might not be necessary to notify the related resource multiplexing pattern information during the secondary base station addition process. After the dual connection is formed, the data transmission of the user plane can be performed by the second electronic device 300B for the terminal device.

C-RAN Implementation

Figure 12:
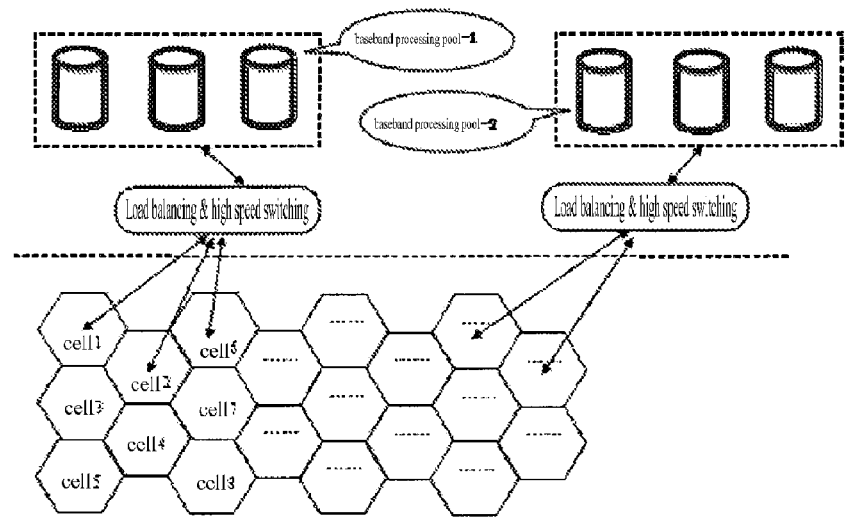
FIG. 12 illustrates a schematic diagram of a C-RAN network architecture in accordance with an embodiment of the present disclosure.

Future wireless network development will build network architectures based on centralized processing, collaborative radio, and real-time cloud computing. For example, one approach may be to concentrate the baseband processing units of multiple carriers while to distribute transceiver units. Specifically, the baseband processing part of traditional cells may be centralized, and the cell resource scheduling, demodulation and decoding are performed by using, for example, a cloud computing-like manner. For each traditional cell, only the corresponding transmit/receive antennas are deployed. This access network architecture can significantly reduce system construction and maintenance costs, thereby improving system performance. An example of this approach is C-RAN (Cloud-based RAN). FIG. 12 illustrates a schematic diagram of the C-RAN network architecture.

As illustrated in FIG. 12, cell 1, cell 2, and cell 6 may be served by a common baseband processing pool 1. In this example, when a terminal device moves between cells served by the baseband processing pool 1, for example, when moving from cell 1 to cell 2, the serving carrier of the terminal device can be converted from the carrier 1 of cell 1 to the carrier 2 of cell 2. Since carrier 1 and carrier 2 are in the same baseband processing unit (i.e., baseband processing pool 1), user scheduling and demodulation and decoding of both cell 1 and cell 2 are performed by baseband processing pool 1. Therefore, the handover of the terminal device between carrier 1 and carrier 2 can be regarded as a change of radio resources or a change in radio channel conditions.

In the example of C-RAN, each baseband processing pool (e.g., baseband processing pool 1 and baseband processing pool 2) may correspond to base stations (e.g., electronic device 300A and electronic device 300B) in traditional cells, and a plurality of cells corresponding to each baseband processing pool may be regarded as larger cells served by the baseband processing pool, and multiple terminal devices within the multiple cells may be regarded as terminals devices served by the baseband processing pool. Thus, the embodiments described herein above are equally applicable to the network architecture of the C-RAN for interference coordination and mobility management between such larger cells.

Exemplary Method

FIG. 13A illustrates an example method for communication in accordance with an embodiment of the present disclosure. As illustrated in FIG. 13A, the method 1300A can include determining, by a first electronic device serving a first cell, resource multiplexing pattern information for a plurality of terminal devices within a first cell (block 1350). The method also includes informing, by the first electronic device serving the first cell, a second electronic device serving a second cell of the determined resource multiplexing pattern information for the plurality of terminal devices within the first cell (block 1360). The detailed example operations of the method can be referred to the above description about the operations and functions performed by the electronic device 300A, which are briefly described as follows.

In one embodiment, the method further comprises obtaining, by a first electronic device, user related information for a plurality of terminal devices within a second cell. Wherein, the resource multiplexing pattern information for the plurality of terminal devices within the first cell is determined based on user related information of the plurality of terminal devices within the first cell and the obtained user related information of the plurality of terminal devices within the second cell.

In an embodiment, a plurality of terminal devices in a first cell and a plurality of terminal devices in a second cell are located in an area where interferences between the first cell and the second cell exist, and a set of resources are multiplexed with a set of predetermined patterns.

In one embodiment, the method further includes evaluating, by the first electronic device, potential interferences to the plurality of terminal devices within the first cell caused by the plurality of terminal devices within the second cell, based on the user related information of the plurality of terminal devices within the second cell. Wherein, the resource multiplexing pattern information for the plurality of terminal devices within the first cell is such determined that the larger the potential interferences are, the more dedicated resources are reserved for the plurality of terminal devices within the second cell to maintain orthogonality with the plurality of terminal devices within the first cell.

In one embodiment, priorities of the plurality of terminal devices within the first cell are higher than those of the plurality of terminal devices within the second cell, and the determining the resource multiplexing pattern information for the plurality of terminal devices within the first cell comprises: performance of resources allocated to the plurality of terminal devices within the first cell is prioritized.

In one embodiment, the plurality of terminal devices in the first cell is a particular set of terminal devices which multiplex resources with a set of predetermined patterns, and informing the second electronic device of the determined resource multiplexing pattern information comprises: informing the second electronic device the resource multiplexing pattern information for the particular set of terminal devices, such that the particular set of terminal devices are served by the second electronic device by using the informed resource multiplexing pattern information after the particular set of terminal devices are handovered from the first cell to the second cell.

In one embodiment, servicing the particular set of terminal devices by the second electronic device comprises at least data transmission in a user plane by the second electronic device.

In one embodiment, a terminal device of the plurality of terminal devices within the first cell is served by the second electronic device by using the informed resource multiplexing pattern information for the terminal device, after the terminal device is handovered from the first cell to the second cell.

In one embodiment, informing the second electronic device of the determined resource multiplexing pattern information and obtaining the user related information of the plurality of terminal devices within the second cell are accomplished through at least one of wire and wireless interfaces.

In one embodiment, if the plurality of terminal devices access respective cells by SCMA, the resource multiplexing pattern information comprises mapping matrices and constellations for the terminal devices; if the plurality of terminal devices access respective cells by PDMA, the resource multiplexing pattern information comprises pattern matrices for the terminal devices; or if the plurality of terminal devices access respective cells by IDMA, the resource multiplexing pattern information comprises interleaver identification information for the terminal devices.

In one embodiment, the user related information comprises at least one of location information, channel state information and device information.

FIG. 13B illustrates another example method for communication in accordance with an embodiment of the present disclosure. As illustrated in FIG. 13B, the method 1300B can include obtaining, by a second electronic device serving a second cell, resource multiplexing pattern information for a plurality of terminal devices within a first cell (block 1370). The detailed example operation of the method can be referred to the above description about the operations and functions performed by the electronic device 300B, which are briefly described as follows.

In one embodiment, the method includes determining, by the second electronic device, resource multiplexing pattern information for a plurality of terminal devices within the second cell based on the obtained resource multiplexing pattern information for the plurality of terminal devices within the first cell.

In one embodiment, the method includes informing, by the second electronic device, a first electronic device serving the first cell of user related information of the plurality of terminal devices within the second cell. Wherein, the obtained resource multiplexing pattern information for the plurality of terminal devices within the first cell is determined based on user related information of the plurality of terminal devices within the first cell and the user related information of the plurality of terminal devices within the second cell.

In one embodiment, the plurality of terminal devices within the first cell and the plurality of terminal devices within the second cell are located in an area where interferences between the first cell and the second cell exist, and a set of resources are multiplexed with a set of predetermined patterns.

In an embodiment, determining the resource multiplexing pattern information for the plurality of terminal devices within the second cell comprises: occupying resources not occupied by the plurality of terminal devices in the first cell firstly, to maintain larger orthogonality between resource multiplexing patterns of the terminal devices within the first and second cells.

In an embodiment, the plurality of terminal devices within the first cell is a particular set of terminal devices which multiplex resources with a set of predetermined patterns, and wherein obtaining the resource multiplexing pattern information for the plurality of terminal devices within the first cell comprises: obtaining the resource multiplexing pattern information for the particular set of terminal devices, such that the particular set of terminal devices are served by the second electronic device by using the obtained resource multiplexing pattern information after the particular set of terminal devices are handovered from the first cell to the second cell.

In one embodiment, serving the particular set of terminal devices by the second electronic device comprises at least conducting data transmission in a user plane by the second electronic device.

In one embodiment, a terminal device of the plurality of terminal devices within the first cell is served by the second electronic device by using the obtained resource multiplexing pattern information for the terminal device, after the terminal device is handovered from the first cell to the second cell.

In one embodiment, informing the first electronic device of the user related information and obtaining the resource multiplexing pattern information for the plurality of terminal devices within the first cell are accomplished through at least one of wire and wireless interfaces.

In an embodiment, if the plurality of terminal devices access respective cells by SCMA, the resource multiplexing pattern information comprises mapping matrices and constellations for the terminal devices; if the plurality of terminal devices access respective cells by PDMA, the resource multiplexing pattern information comprises pattern matrices for the terminal devices; or if the plurality of terminal devices access respective cells by IDMA, the resource multiplexing pattern information comprises interleaver identification information for the terminal devices.

In one embodiment, the user related information comprises at least one of location information, channel state information and device information.

Exemplary Terminal Device

The present disclosure also relates to a terminal device for a wireless communication system, such as described with reference to the previous embodiments. Specifically, the terminal device can be an information providing unit and an information obtaining unit. In an example, the information providing unit can be configured to provide the user related information involving the terminal device to the serving base station of the first cell, for determining resource multiplexing pattern information of a plurality of terminal devices in a first cell. In an example, the information obtaining unit can be configured to obtain resource multiplexing pattern information for the terminal device from the serving base station of the first cell. Wherein, the serving base station informs a second base station serving a second cell of the determined resource multiplexing pattern information for the plurality of terminal devices within the first cell.

The terminal device can be implemented at the chip level, or can also be implemented at the device level by including other external components. For example, the terminal device can operate as a communication device as a complete machine. The above various units are only logical functional modules divided according to the specific functions they implement, and are not intended to limit the specific implementation. In actual implementation, the various units described above may be implemented as separate physical entities, or may be implemented by a single entity (e.g., a processor (CPU or DSP, etc.), processing circuitry, etc.). Wherein, the processing circuitry can refer to various implementations of digital circuitry, analog circuitry, or mixed signal (combination of analog and digital) circuitry that perform functions in a computing system. Processing elements can include, for example, circuits such as an integrated circuit (IC), an application specific integrated circuit (ASIC), a portion or circuit of separate processor cores, an entire processor core, a separate processor, a programmable hardware device such as a field programmable gate array (FPGA), and/or systems including multiple processors.

It should be understood that the machine-executable instructions in the storage medium and the program product according to the embodiments herein can also be configured to perform the methods corresponding to the apparatus embodiment described above, and thus the content not described in detail herein can be referred to the previous corresponding descriptions, which will not be repeated herein.

Accordingly, a storage medium for carrying the above-described program product including machine executable instructions is also included in the disclosure of the present invention. The storage medium includes, but is not limited to, a floppy disk, an optical disk, a magneto-optical disk, a memory card, a memory stick, and the like.

Figure 14:
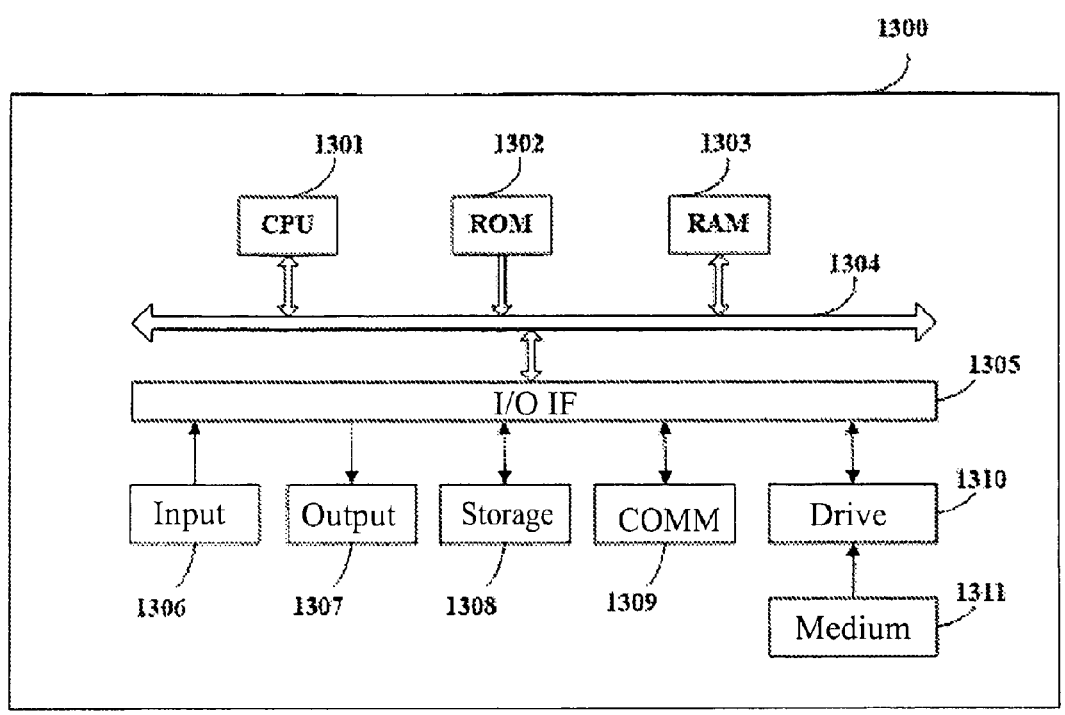
FIG. 14 is a block diagram of an example structure of a personal computer as an information processing device which can be employed in an embodiment of the present disclosure.

In addition, it should also be noted that the above series of processes and devices can also be implemented by software and/or firmware. In the case of being implemented by software and/or firmware, a program constituting the software is installed from a storage medium or a network to a computer having a dedicated hardware structure, such as the general-purpose personal computer 1300 shown in FIG. 14, which, when is installed with various programs, can execute various functions and so on. FIG. 14 is a block diagram showing an example structure of a personal computer which can be employed as an information processing device in the embodiment herein. In one example, the personal computer can correspond to the above-described exemplary terminal device in accordance with the present disclosure.

In FIG. 14, a central processing unit (CPU) 1301 executes various processes in accordance with a program stored in a read-only memory (ROM) 1302 or a program loaded from a storage 1308 to a random access memory (RAM) 1303. In the RAM 1303, data required when the CPU 1301 executes various processes and the like is also stored as needed.

The CPU 1301, the ROM 1302, and the RAM 1303 are connected to each other via a bus 1304. Input/output interface 1305 is also connected to bus 1304.

The following components are connected to the input/output interface 1305: an input unit 1306 including a keyboard, a mouse, etc.; an output unit 1307 including a display such as a cathode ray tube (CRT), a liquid crystal display (LCD), etc., and a speaker, etc.; the storage 1308 including a hard disk etc.; and a communication unit 1309 including a network interface card such as a LAN card, a modem, etc. The communication unit 1309 performs communication processing via a network such as the Internet.

A driver 1310 is also connected to the input/output interface 1305 as needed. A removable medium 1311 such as a magnetic disk, an optical disk, a magneto-optical disk, a semiconductor memory or the like is mounted on the drive 1310 as needed, so that a computer program read therefrom is installed into the storage 1308 as needed.

In the case where the above-described series of processing is implemented by software, a program constituting the software is installed from a network such as the Internet or a storage medium such as the removable medium 1311.

It will be understood by those skilled in the art that such a storage medium is not limited to the removable medium 1311 shown in FIG. 14 in which a program is stored and distributed separately from the device to provide a program to the user. Examples of the removable medium 1311 include a magnetic disk (including a floppy disk (registered trademark)), an optical disk (including a compact disk read only memory (CD-ROM) and a digital versatile disk (DVD)), a magneto-optical disk (including a mini disk (MD) (registered trademark)) and a semiconductor memory. Alternatively, the storage medium may be a ROM 1302, a hard disk included in the storage section 1308, or the like, in which programs are stored, and distributed to users together with the device containing them.

The technology of the present disclosure can be applied to various products. For example, the base stations mentioned in this disclosure can be implemented as any type of evolved Node B (eNB), such as a macro eNB and a small eNB. The small eNBcan be an eNB covering a cell smaller than the macro cell, such as a picoeNB, a micro eNB, and a home (femto) eNB. Alternatively, the base station can be implemented as any other type of base station, such as a NodeB and a Base Transceiver Station (BTS). The base station can include: a body (also referred to as a base station device) configured to control radio communication; and one or more remote radio heads (RRHs) disposed at a different location from the body, in addition, various types of terminals which will be described below can each operate as a base station by performing base station functions temporarily or semi-persistently.

For example, the terminal device mentioned in the present disclosure, also referred to as a user device in some examples, can be implemented as a mobile terminal (such as a smartphone, a tablet personal computer (PC), a notebook PC, a portable game terminal, a portable/dangle type mobile router and digital camera) or in-vehicle terminal (such as car navigation device). The user device may also be implemented as a terminal that performs machine-to-machine (M2M) communication (also referred to as a machine type communication (MTC) terminal). Further, the user device may be a radio communication module (such as an integrated circuit module including a single wafer) installed on each of the above terminals.

Use cases according to the present disclosure will be described below with reference to FIGS. 15 to 18,

[Use Cases for Base Stations]

It should be understood that the term base station in this disclosure has the full breadth of its ordinary meaning, and includes at least a radio communication station used as portion of a wireless communication system or radio system to facilitate communication. Examples of the base station can be, for example but not limited to, the following: the base station can be either or both of a base transceiver station (BTS) and a base station controller (BSC) in the GSM system, and can be either or both of a radio network controller (RNC) or Node B in the WCDMA system, can be eNB in the LTE and LTE-Advanced system, or can be corresponding network nodes in future communication systems (e.g., the eNB that can appear in the 5G conununication systems, eLTEeNB, etc.). Some of the functions in the base station of the present disclosure can also be implemented as an entity having a control function for communication in the scenario of a D2D, M2M, and V2V communication, or as an entity that plays a spectrum coordination role in the scenario of a cognitive radio communication.

First Use Case

Figure 15:
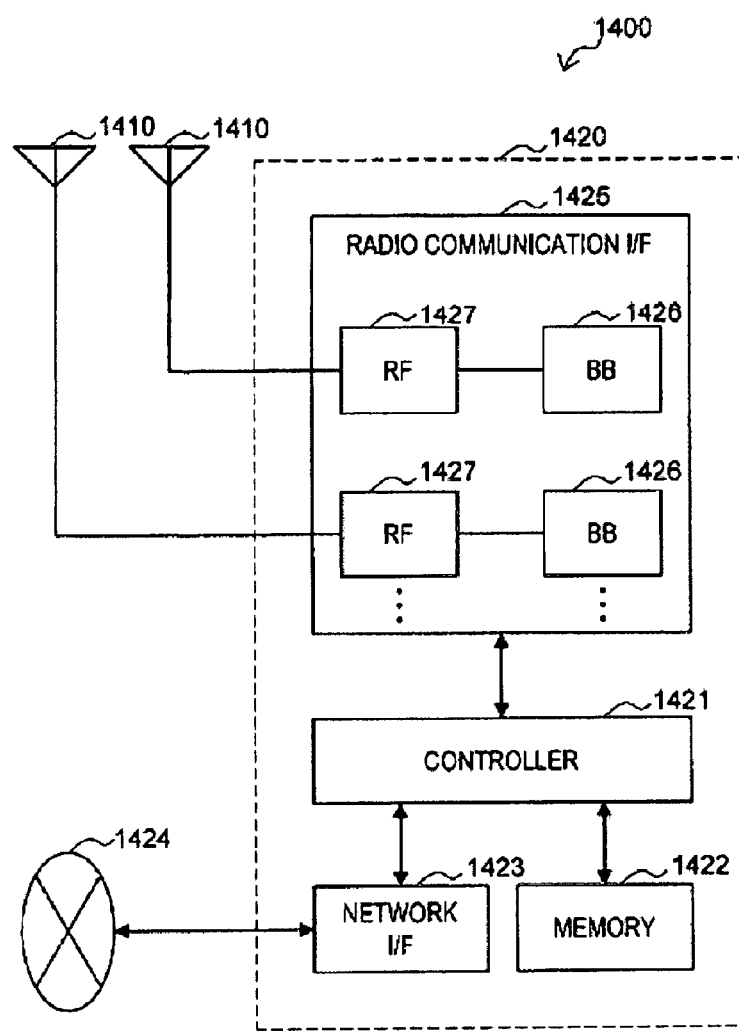
FIG. 15 is a block diagram illustrating a first example of a schematic configuration of an evolved node (eNB) to which the technology of the present disclosure can be applied.

FIG. 15 is a block diagram illustrating a first example of a schematic configuration of a eNB to which the technology of the present disclosure can be applied. The eNB 1400 includes a plurality of antennas 1410 and a base station device 1420. The base station device 1420 and each antenna 1410 may be connected to each other via an RF cable. In one implementation, the eNB 1400 (or base station device 1420) herein may correspond to the electronic devices 300A and/or 300B described above.

Each of the antennas 1410 includes a single or multiple antenna elements (such as multiple antenna elements included in a Multiple Input and Multiple Output (MIMO) antenna), and is used for the base station device 1420 to transmit and receive radio signals. As shown in FIG. 15, the eNB 1400 may include multiple antennas 1410. For example, multiple antennas 1410 may be compatible with multiple frequency bands used by the eNB 1400.

The base station device 1420 includes a controller 1421, a memory 1422, a network interface 1423, and a radio communication interface 1425.

The controller 1421 may be, for example, a CPU or a DSP, and operates various functions of higher layers of the base station device 1420. For example, controller 1421 generates data packetsfroin data in signals processed by the radio communication interface 1425, andtransfers the generated packets via network interface 1423. The controller 1421 can bundle data from multiple baseband processors to generate the bundled packets, andtransfer the generated bundled packets. The controller 1421 may have logic functions of performing control such as radio resource control, radio bearer control, mobility management, admission control, and scheduling. This control may be performed in corporation with a eNB or a core network node in the vicinity. The memory 1422 includes RAM and ROM, and stores a program that is executed by the controller 1421 and various types of control data such as a terminal list, transmission power data, and scheduling data.

The network interface 1423 is a communication interface for connecting the base station device 1420 to the core network 1424. Controller 1421 may communicate with a core network node or another eNB via the network interface 1423. In this case, the eNB 1400 and the core network node or other eNBs may be connected to each other through a logical interface such as an S1 interface and an X2 interface. The network interface 1423 may also be a wired communication interface or a radio communication interface for radio backhaul lines. If the network interface 1423 is a radio communication interface, the network interface 1423 may use a higher frequency band for radio communication than a frequency band used by the radio communication interface 1425.

The radio communication interface 1425 supports any cellular communication schemes, such as Long Term Evolution (LTE) and LTE-Advanced, and provides radio connection to a terminal positioned in a cell of the eNB 1400 via the antenna 1410. Radio communication interface 1425 may typically include, for example, a baseband (BB) processor 1426 and a RF circuit 1427. The BB processor 1426 may perform, for example, encoding/decoding, modulation/demodulation, and multiplexing/demultiplexing, and performs various types of signal processing of layers such as L1, Medium Access Control (MAC), Radio Link Control (RLC), and Packet Data Convergence Protocol (PDCP). Instead of controller 1421, the BB processor 1426 may have a part or all of the above-described logic functions. The BB processor 1426 may be a memory that stores a communication control program, or a module that includes a processor configured to execute the program and a related circuit. Updatingthe program may allow the functions of the BB processor 1426 to be changed. The module may be a card or a blade that is inserted into a slot of the base station device 1420. Alternatively, the module may also be a chip that is mounted on the card or the blade. Meanwhile, the RF circuit 1427 may include, for example, a mixer, a filter, and an amplifier, and transmits and receives radio signals via the antenna 1410. Although FIG. 25 illustrates an example in which one RF circuit 1427 is connected to one antenna 1410, the present disclosure is not limited to theretmather, one RF circuit 1427 may connect to a plurality of antennas 1410 at the same time.

As illustrated in FIG. 15, the radio communication interface 1425 may include the multiple BB processors 1426. For example, the multiple BB processors 1426 may be compatible with multiple frequency hands used by eNB 1400. As illustrated in FIG. 15, the radio communication interface 1425 may include the multiple RF circuits 1427. For example, the multiple RF circuits 1427 may be compatible with multiple antenna elements. Although FIG. 15 illustrates the example in which the radio communication interface 1425 includes the multiple BB processors 1426 and the multiple RF circuits 1427, the radio communication interface 1425 may also include a single BB processor 1426 or a single RF circuit 1427.

Second Use Case

Figure 16:
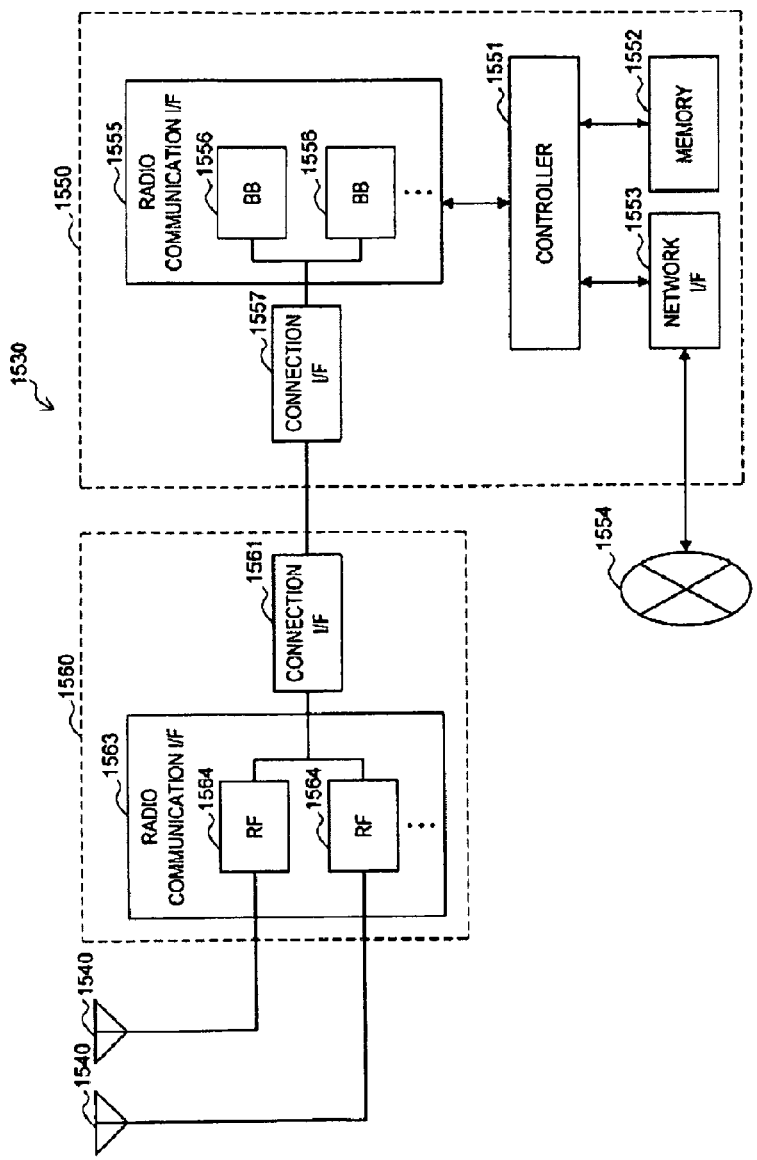
FIG. 16 is a block diagram illustrating a second example of a schematic configuration of an eNB to which the technology of the present disclosure can be applied.

FIG. 16 is a block diagram illustrating a second example of a schematic configuration of an eNB to which the technology of the present disclosure may be applied. The eNB 1530 includes a plurality of antennas 1540, a base station device 1550, and an RRH 1560. The RRH 1560 and each antenna 1540 may be connected to each other via an RF cable. The base station device 1550 and the RRH 1560 may be connected to each other via a high speed line such as a fiber optic cable. In one implementation, the eNB 1530 (or base station device 1550) herein may correspond to the electronic devices 300A and/or 300B described above.

Each of the antennas 1540 includes a single or multiple antenna elements such as multiple antenna elements included in a MIMO antenna and is used for the RRH 1560 to transmit and receive radio signals. The eNB 1530 may include multiple antennas 1540, as illustrated in FIG. 16. For example, multiple antennas 1540 may be compatible with multiple frequency bands used by the eNB 1530.

The base station device 1550 includes a controller 1551, a memory 1552, a network interface 1553, a radio communication interface 1555, and a connection interface 1557. The controller 1551, the memory 1552, and the network interface 1553 are the same as the controller 1421, the memory 1422, and the network interface 1423 described with reference to FIG. 15.

The radio communication interface 1555 supports any cellular communication scheme such as LTE and LTE-Advanced) and provides radio communication to terminals positioned in a sector corresponding to the RRH 1560 via the RRH 1560 and the antenna 1540. The radio communication interface 1555 may typically include, for example, a BB processor 1556, The BB processor 1556 is the same as the BB processor 1426 described with reference to FIG. 15, except that the BB processor 1556 is connected to the RF circuit 1564 of the RRH 1560 via the connection interface 1557. The radio communication interface 1555 may include the multiple BB processors 1556, as illustrated in FIG. 16. For example, the multiple BB processors 1556 may be compatible with multiple frequency bands used by the eNB 1530. Although FIG. 16 illustrates the example in which the radio communication interface 1555 includes multiple BB processors 1556, the radio communication interface 1555 may also include a single BB processor 1556.

The connection interface 1557 is an interface for connecting the base station device 1550 (radio communication interface 1555) to the RRH 1560. The connection interface 1557 may also be a communication module for communication in the above-described high speed line that connects the base station device 1550 (radio communication interface 1555) to the RRH 1560.

The RRH 1560 includes a connection interface 1561 and a radio communication interface 1563.

The connection interface 1561 is an interface for connecting the RRH 1560 (radio communication interface 1563) to the base station device 1550. The connection interface 1561 may also be a communication module for communication in the above-described high speed line.

The radio communication interface 1563 transmits and receives radio signals via the antenna 1540. Radio communication interface 1563 may typically include, for example, the RF circuitry 1564. The RF circuit 1564 may include, for example, a mixer, a filter, and an amplifier, and transmits and receives radio signals via the antenna 1540. Although FIG. 16 illustrates the example in which one RF circuit 1564 is connected to one antenna 1540, the present disclosure is not limited to thereto; rather, one RF circuit 1564 may connect to a plurality of antennas 1540 at the same time.

The radio communication interface 1563 may include multiple RF circuits 1564, as illustrated in FIG. 16. For example, multiple RF circuits 1564 may support multiple antenna elements. Although FIG. 16 illustrates the example in which the radio communication interface 1563 includes the multiple RF circuits 1564, the radio communication interface 1563 may also include a single RF circuit 1564.

Use Cases related to User Devices

First Use Case

Figure 17:
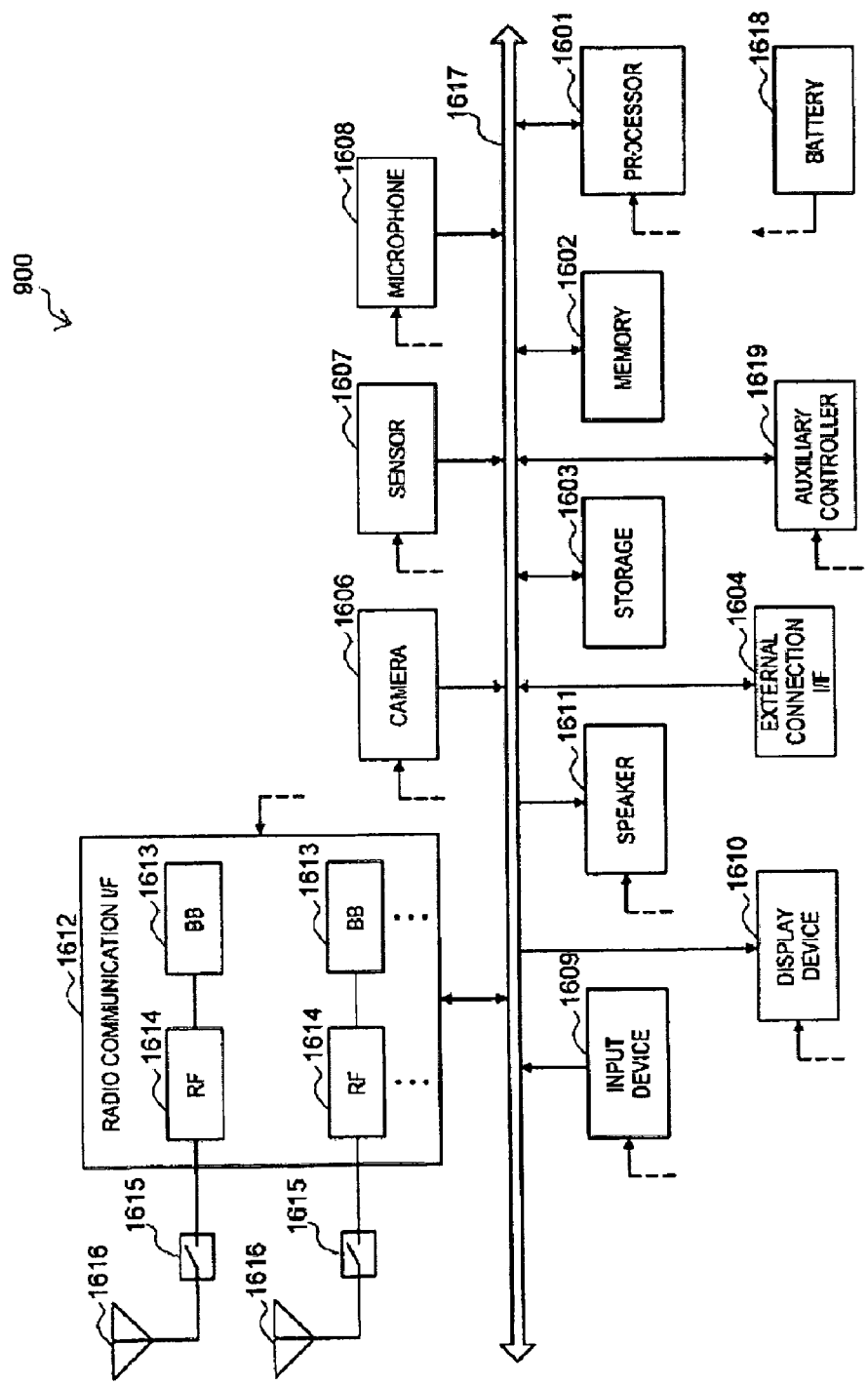
FIG. 17 is a block diagram illustrating an example of a schematic configuration of a smartphone to which the technology of the present disclosure can be applied.

FIG. 17 is a block diagram illustrating an example of a schematic configuration of a smartphone 1600 to which the technology of the present disclosure may be applied. The smartphone 1600 includes a processor 1601, a memory 1602, a storage 1603, an external connection interface 1604, an camera 1606, a sensor 1607, a microphone 1608, an input device 1609, a display device 1610, a speaker 1611, a radio communication interface 1612, one or more antenna switch 1615, one or more antennas 1616, a bus 1617, a battery 1618, and an auxiliary controller 1619. In one implementation, smartphone 1600 (or processor 1601) herein may correspond to terminal device described above.

The processor 1601 may be, for example, a CPU or a system on chip (SoC), and controls functions of an application layer and the other layers of the smartphone 1600. The memory 1602 includes RAM and ROM, and stores a program that is executed by the processor 1601, and data. The storage 1603 may include a storage medium such as a semiconductor memory and a hard disk. The external connection interface 1604 is an interface for connecting an external device such as a memory card and a universal serial bus (USB) device to the smartphone 1600.

The camera 1606 includes an image sensor such as a charge coupled device (CCD) and a complementary metal oxide semiconductor (CMOS), and generates a captured image. Sensor 1607 may include a group of sensors such as a measurement sensor, a gyro sensor, a geomagnetic sensor, and an acceleration sensor. The microphone 1608 converts the sounds that are input to the smartphone 1600 to audio signals. The input device 1609 includes, for example, a touch sensor configured to detect touch on a screen of the display device 1610, a keypad, a keyboard, a button, or a switch, and receives an operation or an information input from a user. The display device 1610 includes a screen such as a liquid crystal display (LCD) and an organic light emitting diode (OLED) display, and displays an output image of the smartphone 1600. The speaker 1611 converts audio signals that are output from the smartphone 1600 to sounds.

The radio communication interface 1612 supports any cellular communication scheme such as LTE and LTE-Advanced, and performs radio communication. The radio communication interface 1612 may typically include, for example, a BB processor 1613 and an RF circuitry 1614. The BB processor 1613 may perform, for example, encoding/decoding, modulation/demodulation, and multiplexing/demultiplexing, and performs various types of signal processing for radio communication. Meanwhile, the RF circuit 1614 may include, for example, a mixer, a filter, and an amplifier, and transmits and receives radio signals via the antenna 1616. The radio communication interface 1612 may be a one chip module that integrates the BB processor 1613 and the RF circuit 1614 thereon. The radio communication interface 1612 may include multiple BB processors 1613 and multiple RF circuits 1614, as illustrated in FIG. 17, Although FIG. 17 illustrates the example in which the radio communication interface 1612 includes multiple BB processors 1613 and multiple RF circuits 1614, the radio communication interface 1612 may also include a single BB processor 1613 or a single RF circuit 1614.

Furthermore, in addition to a cellular communication scheme, the radio communication interface 1612 may support additional type of radio communication schemes, such as short-range wireless communication schemes, a near field communication schemes, and a wireless local area network (LAN) scheme. In this case, the radio communication interface 1612 may include the BB processor 1613 and the RF circuitry 1614 for each radio communication scheme.

Each of the antenna switches 1615 switches connection destinations of the antenna 1616 among multiple circuits (such as circuits for different radio communication schemes) included in the radio communication interface 1612.

Each of the antennas 1616 includes a single or multiple antenna elements (such as multiple antenna elements included in a MIMO antenna) and is used for the radio communication interface 1612 to transmit and receive radio signals. The smartphone 1600 may include multiple antennas 1616, as illustrated in FIG. 17. Although FIG. 17 illustrates the example in which the smartphone 1600 includes multiple antennas 1616, the smartphone 1600 may also include a single antenna 1616.

Furthermore, the smartphone 1600 may include the antenna 1616 for each radio communication scheme. In this case, the antenna switch 1615 may be omitted from the configuration of the smartphone 1600.

The bus 1617 connects the processor 1601, the memory 1602, the storage 1603, the external connection interface 1604, the camera 1606, the sensor 1607, the microphone 1608, the input device 1609, the display device 1610, the speaker 1611, the radio communication interface 1612, and the auxiliary control 1619 to each other. The battery 1618 supplies power to blocks of the smartphone 1600 illustrated in FIG. 17 via feeder lines, which are partially shown as a dashed line in the figure. The auxiliary controller 1619 operates a minimum necessary function of the smartphone 1600, for example, in a sleep mode.

Second Use Case

Figure 18:
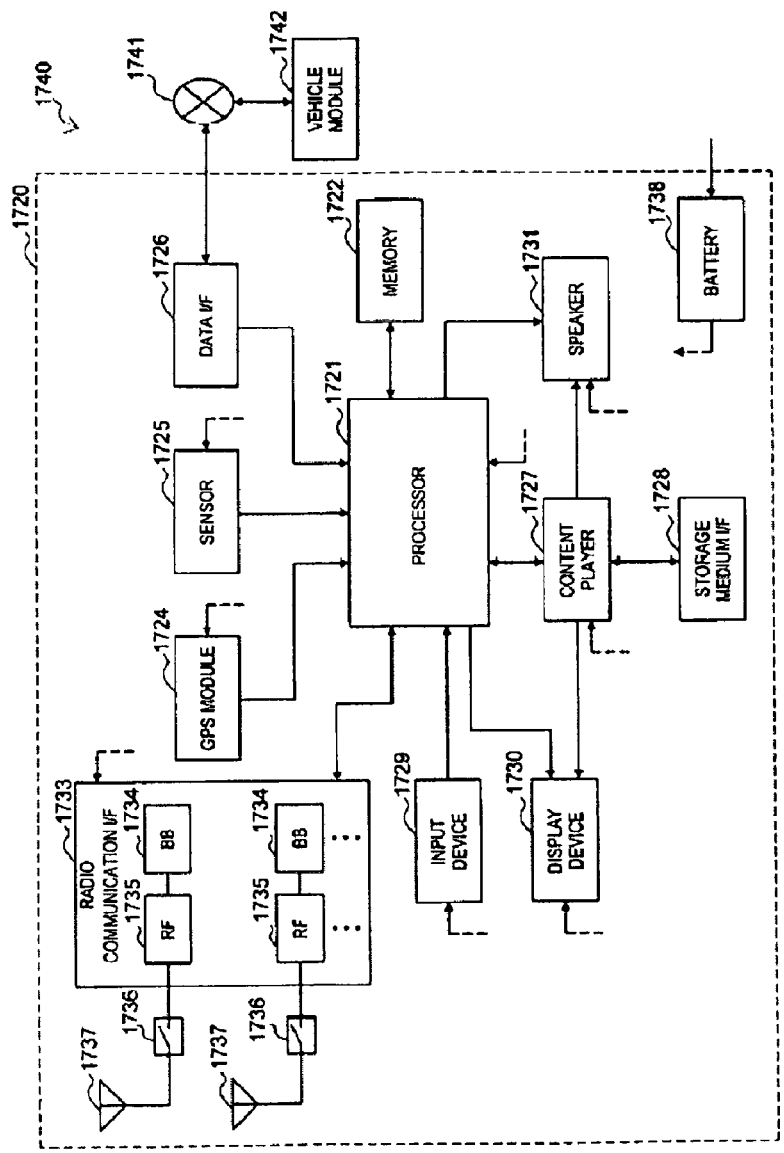
FIG. 18 is a block diagram illustrating an example of a schematic configuration of a car navigation device to which the technology of the present disclosure can be applied.

FIG. 18 is a block diagram illustrating an example of a schematic configuration of a car navigation device 1720 to which the technology of the present disclosure may be applied. The car navigation device 1720 includes a processor 1721, a memory 1722, a global positioning system (GPS) module 1724, a sensor 1725, a data interface 1726, a content player 1727, a storage medium interface 1728, an input device 1729, a display device 1730, a speaker 1731, and a radiocommunication interface 1733, one or more antenna switches 1736, one or more antennas 1737, and a battery 1738. In one implementation, car navigation device 1720 (or processor 1721) herein may correspond to terminal device described above.

The processor 1721 may be, for example, a CPU or a SoC, and controls a navigation function and other functions of the car navigation device 1720. The memory 1722 includes RAM and ROM, and stores a program that is executed by the processor 1721, and data.

The GPS module 1724 uses GPS signals received from a GPS satellite to measure a position, such as latitude, longitude, and altitude, of the car navigation device 1720. Sensor 1725 may include a group of sensors such as a gyro sensor, a geomagnetic sensor, and an air pressure sensor. The data interface 1726 is connected to, for example, an in-vehicle network 1741 via a terminal not shown, and acquires data generated by the vehicle, such as vehicle speed data.

The content player 1727 reproduces content stored in a storage medium (such as a CD and a DVD) that is inserted into the storage medium interface 1728. The input device 1729 includes, for example, a touch sensor configured to detect touch on a screen of the display device 1730, a button, or a switch, and receives an operation or an information input from a user. The display device 1730 includes a screen such as an LCD or an OLED display, and displays an image of the navigation function or content that is reproduced. The speaker 1731 outputs sounds of the navigation function or the content that is reproduced.

The radio communication interface 1733 supports any cellular communication scheme, such as LTE and LTE-Advanced, and performs radio communication. The radio communication interface 1733 may typically include, for example, a BB processor 1734 and an RF circuit 1735. The BB processor 1734 may perform, for example, encoding/decoding, modulation/demodulation, and multiplexing/demultiplexing, and performs various types of signal processing for radio communication. Meanwhile, the RF circuit 1735 may include, for example, a mixer, a filter, and an amplifier, and transmits and receives radio signals via the antenna 1737. The radio communication interface 1733 may also be a one chip module which integrates the RB processor 1734 and the RF circuit 1735 thereon. The radio communication interface 1733 may include multiple BB processors 1734 and multiple RF circuits 1735, as illustrated in FIG. 18. Although FIG. 18 illustrates the example in which the radio communication interface 1733 includes multiple BB processors 1734 and multiple RF circuits 1735, the radio communication interface 1733 may also include a single BB processor 1734 or a single RF circuit 1735.

Furthermore, in addition to a cellular communication scheme, the radio communication interface 1733 may support another type of radio communication scheme such as a short-range wireless communication scheme, a near-field communication scheme, and a wireless LAN scheme. In this case, the radio communication interface 1733 may include the BB processor 1734 and the RF circuit 1735 for each radio communication scheme.

Each of the antenna switches 1736 switches the connection destination of the antenna 1737 among multiple circuits (such as circuits for different radio communication schemes) included in the radio communication interface 1733.

Each of the antennas 1737 includes a single or multiple antenna elements, such as multiple antenna elements included in a MIMO antenna, and is used for the radio communication interface 1733 to transmit and receive radio signals. The car navigation device 1720 may include multiple antennas 1737, as illustrated in FIG. 18. Although FIG. 18 illustrates the example in which the car navigation device 1720 includes multiple antennas 1737, the car navigation device 1720 may also include a single antenna 1737.

Furthermore, the car navigation device 1720 may include the antenna 1737 for each radio communication scheme. In this case, the antenna switch 1736 may be omitted from the configuration of the car navigation device 1720.

The battery 1738 supplies power to blocks of the car navigation device 1720 illustrated in FIG. 18 via feeder lines that are partially shown as dashed lines in the figure. Battery 1738 accumulates power supplied from the vehicle.

The technology of the present disclosure may also be realized as an in-vehicle system (or vehicle) 1740 including one or more blocks of the car navigation device 1720, the in-vehicle network 1741, and the vehicle module 1742. The vehicle module 1742 generates vehicle data such as vehicle speed, engine speed, and faults information, and outputs the generated data to the in-vehicle network 1741.

Performance Simulation

Figure 19:
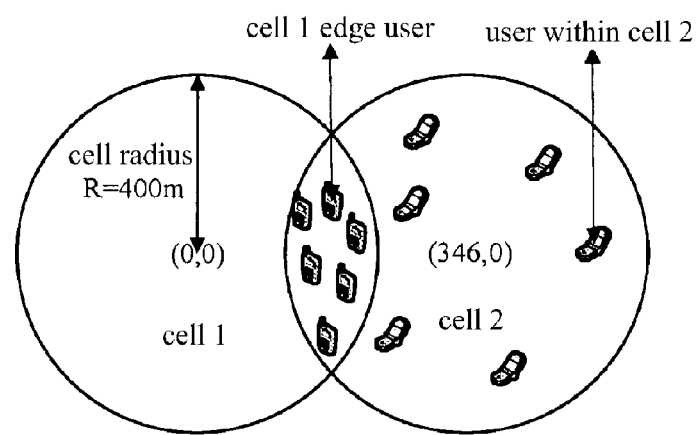
FIG. 19 illustrates a system schematic diagram for performance simulation in accordance with an embodiment of the present disclosure.

In order to verify the performance of the technical solution of the present disclosure, the simulation is performed by taking an SCMA system including two cells as illustrated in FIG. 19 as an example. The simulation takes a downlink communication scenario as an example. The cell configuration parameters used are as shown in Table 1:

TABLE 1

| Cell configuration parameters | |
|---|---|
| PARAMETER | VALUE |
| Cell radius | 400 m |
| Maximum transmit power at the base station side | 46 dBm |
| Large-scale fading | 128.1 + 37.6log$_{10}$(D) D in km |
| Number of resource blocks | 4 |
| Resource block bandwidth | 18 kHz |
| Small-scale fading | Rayleigh fading |
| Channel estimation | perfect channel estimation |
| Background noise power | −174 dBm/Hz |

As illustrated in FIG. 19, there are one base station and six terminal devices in each cell. The coordinates of the base stations in cell 1 and cell 2 are respectively (0, 0) and (200 √3, 0), where 200√3≈346 in meter. Where cell 1 is a high priority cell and cell 2 is a low priority cell. The terminal devices in the cell 1 are evenly distributed in the overlapping area $\{(x, y)|0<x^2+y^2<400^2 \text{ and } 0<(x-200\sqrt{3})^2+y^2<400^2\}$ of the two cells. The terminal devices in the cell 2 are evenly distributed in the area $\{(x, y)|0<(x-200\sqrt{3})^2+y^2<400^2\}$.

By employing power control techniques, the base station within cell 2 communicates using the maximum transmit power (46 dBm) only when communicating with its farthest terminal device. When communicating with other terminal devices, it adjusts the transmit power by using the following principles:

$$P_j g_j = P_{max} g_{max}$$

where $P_j$ and $g_j$ indicates respectively the transmission power of the base station within the cell 2 to the j-th terminal device within the cell 2 and the large-scale fading between the two, $P_{max}$ ($P_{max}$=46 dBm) representing the maximum transmit power of the base station, where the subscript max represents the numbering of the terminal device farthest from the base station within the cell 2. This principle can ensure that the expected values of the received signal strength of any terminal device within the cell 2 are the same. The base stations within cell 1 also adjust the transmission power used by the base station to communicate with the terminal device within cell 1 by using this principle.

All terminal devices in the cell adopt SCMA access mode, and the mapping matrix factor graph is:

$$F = \begin{bmatrix} 1 & 1 & 1 & 0 & 0 & 0 \\ 1 & 0 & 0 & 1 & 1 & 0 \\ 0 & 1 & 0 & 1 & 0 & 1 \\ 0 & 0 & 1 & 0 & 1 & 1 \end{bmatrix}$$

Therefore, the inter-cell interference generated by the cell 2 on the i-th resource block to the j-th edge terminal device within the cell 1 can be calculated by the following formula:

$$I_{ij} = \Sigma_{k=1}^{6} P_k |h_{ijk}|^2 g_{ij} F_{ik}$$

where $P_k$ ($P_k$<46 dBm) represents the transmission power of the base station within the cell 2 to the k-th terminal device within the cell 2, and $h_i$ represents a small-scale fading (channel gain) of the link between the edge terminal device within cell 1 and the base station within cell 2 on the i-th resource block, while $g_{ij}$ represents a large-scale fading of the link between the j-th edge terminal device within the cell 1 and the base station within the cell 2 on the t-th resource block. In addition, $F_{ik}$ is an element in the mapping matrix factor graph F, if $F_{ik}$=1, then it means the i-th resource block is used by the k-th terminal device; if $F_{ik}$=0, then it means the i-th resource block is not used by the k-th terminal device. Then, the inter-cell interference strength of the base station within the cell 2 subjected by each edge terminal device within cell 1 can be calculated.

The simulation experiment compares the random allocation codebook (that is, the random allocation of the codebook to the edge terminal devices within cell 1 and all the terminal devices within cell 2) and the allocation scheme of the present disclosure, and the system average error rate in the two cases. In the simulation experiment, locations of the edge terminal devices within cell 1 and the terminal devices within cell 2 are randomly generated each time, and then the receiver end Signal to Interference plus Noise Ratio (SINK) of the edge terminal devices within cell 1 is calculated by the above method, and then the number of error bit is tested. The above operation is repeated 100,000 times, and the average bit error rate (BER) of the edge terminal devices within cell 1 in the system is counted.

TABLE 2

| | Average bit error rate | |
|---|---|---|
| | Random allocation | Present disclosure scheme |
| bit error rate (BER) | 0.0315 | 0.01745 |

The simulation results of the inventive example can show that the bit error rate of the allocation scheme of the present disclosure is significantly reduced compared to the random allocation, that is, the error performance of the system is significantly improved.

The exemplary embodiments of the present disclosure have been described above with reference to the drawings, but the present disclosure is of course not limited to the above examples. A person skilled in the art can make various changes and modifications within the scope of the appended claims, and it is understood that such changes and modifications will naturally fall within the technical scope of the present disclosure.

For example, a plurality of functions included in one unit in the above embodiments can be implemented by separate apparatus. Alternatively, a plurality of functions implemented by a plurality of units in the above embodiments may be implemented by separate apparatus, respectively. In addition, one of the above functions may be implemented by a plurality of units. Needless to say, such a configuration is included in the technical scope of the present disclosure.

In this specification, the steps described in the flowcharts include not only processes performed in time series in the stated order, but also processes performed in parallel or individually rather than necessarily in time series. Further, even in the steps of processing in time series, it is needless to say that the order can be appropriately changed.

The present disclosure and its advantages are described in detail, and it is understood that various changes, substitutions and changes can be made without departing from the spirit and scope of the disclosure. Furthermore, the term "comprising". "containing" or any other variants of the embodiments of the present disclosure is intended to cover a non-exclusive inclusion, such that a process, method, article, or device comprising a series of elements includes not only those elements but also includes other elements that are not explicitly listed, or elements that are inherent to such a process, method, article, or device. An element that is defined by the phrase "comprising one . . . " does not exclude the presence of additional equivalent elements in the process, method, article, or device that comprises the element, without more restrictions.

What is claimed is:

1. An electronic device for a wireless communication system, wherein the electronic device is a first electronic device serving a first cell and comprise a processing circuitry, and the processing circuitry is configured to:
    obtain user related information of a plurality of terminal devices within a second cell;
    evaluate potential interferences to a plurality of terminal devices within the first cell caused by the plurality of terminal devices within the second cell, based on the user related information of the plurality of terminal devices within the second cell;
    determine resource multiplexing pattern information for a plurality of terminal devices within the first cell, the resource multiplexing pattern information for the plurality of terminal devices within the first cell being determined based on user related information of the plurality of terminal devices within the first cell and obtained user related information of the plurality of terminal devices within the second cell; and
    inform a second electronic device serving a second cell of the determined resource multiplexing pattern information for the plurality of terminal devices within the first cell,
    wherein the resource multiplexing pattern information for the plurality of terminal devices within the first cell is such determined that the larger the potential interferences are, the more dedicated resources are reserved for the plurality of terminal devices within the second cell to maintain orthogonality with the plurality of terminal devices within the first cell.

2. The electronic device of claim 1, wherein the plurality of terminal devices within the first cell and the plurality of terminal devices within the second cell are located in an area where interferences between the first cell and the second cell exist, and a set of resources are multiplexed with a set of predetermined patterns among the plurality of terminal devices within the first cell and the plurality of terminal devices within the second cell.

3. The electronic device of claim 1, wherein priorities of the plurality of terminal devices within the first cell are higher than those of the plurality of terminal devices within the second cell, and the determining the resource multiplexing pattern information for the plurality of terminal devices within the first cell comprises:
    performance of resources allocated to the plurality of terminal devices within the first cell is prioritized over performance of resources allocated to the plurality of terminal devices within the second cell;
    wherein the plurality of terminal devices within the first cell is a particular set of terminal devices which multiplex resources with a set of predetermined patterns, and wherein informing the second electronic device of the determined resource multiplexing pattern information comprises:
    informing the second electronic device the resource multiplexing pattern information for the particular set of terminal devices, such that the particular set of terminal devices are served by the second electronic device by using the informed resource multiplexing pattern information after the particular set of terminal devices are handovered from the first cell to the second cell; and
    wherein serving the particular set of terminal devices by the second electronic device comprises at least conducting data transmission in a user plane by the second electronic device.

4. The electronic device of claim 1, wherein a terminal device of the plurality of terminal devices within the first cell is served by the second electronic device by using the informed resource multiplexing pattern information for the terminal device, after the terminal device is handovered from the first cell to the second cell.

5. The electronic device of claim 1, wherein informing the second electronic device of the determined resource multiplexing pattern information and obtaining the user related information of the plurality of terminal devices within the second cell are accomplished through at least one of wire and wireless interfaces; and
    wherein the user related information comprises at least one of location information, channel state information and device information.

6. The electronic device of claim 1, wherein:
   if the plurality of terminal devices access respective cells by SCMA, the resource multiplexing pattern information comprises mapping matrices and constellations for the terminal devices;
   if the plurality of terminal devices access respective cells by PDMA, the resource multiplexing pattern information comprises pattern matrices for the terminal devices; and
   if the plurality of terminal devices access respective cells by IDMA, the resource multiplexing pattern information comprises interleaver identification information for the terminal devices.

7. An electronic device for a wireless communication system, wherein the electronic device is a second electronic device serving a second cell and comprise a processing circuitry, and the processing circuitry is configured to:
   obtain resource multiplexing pattern information for a plurality of terminal devices within a first cell, the plurality of terminal devices within the first cell being a particular set of terminal devices which multiplex resources with a set of predetermined patterns; and
   perform at least one of uplink communication and downlink communication based on the obtained resource multiplexing pattern information,
   wherein obtaining the resource multiplexing pattern information for the plurality of terminal devices within the first cell comprises obtaining the resource multiplexing pattern information for the particular set of terminal devices, such that the particular set of terminal devices are served by the second electronic device by using the obtained resource multiplexing pattern information after the particular set of terminal devices are handovered from the first cell to the second cell.

8. The electronic device of claim 7, wherein the processing circuitry is further configured to determine resource multiplexing pattern information for a plurality of terminal devices within the second cell based on obtained resource multiplexing pattern information for the plurality of terminal devices within the first cell.

9. The electronic device of claim 8, wherein the determining the resource multiplexing pattern information for the plurality of terminal devices within the second cell comprises:
   occupying resources not occupied by the plurality of terminal devices in the first cell firstly, to maintain larger orthogonality between resource multiplexing patterns of the terminal devices within the first and second cells.

10. The electronic device of claim 8, Wherein a terminal device of the plurality of terminal devices within the first cell is served by the second electronic device by using the obtained resource multiplexing pattern information for the terminal device, after the terminal device is handovered from the first cell to the second cell.

11. The electronic device of claim 8, wherein informing the first electronic device of the user related information and obtaining the resource multiplexing pattern information for the plurality of terminal devices within the first cell are accomplished through at least one of wire and wireless interfaces; and
   wherein the user related information comprises at least one of location information, channel state information and device information.

12. The electronic device of claim 7, wherein the processing circuitry is further configured to inform a first electronic device serving the first cell of user related information of the plurality of terminal devices within the second cell; and
   wherein the obtained resource multiplexing pattern information for the plurality of terminal devices within the first cell is determined based on user related information of the plurality of terminal devices within the first cell and user related information of the plurality of terminal devices within the second cell.

13. The electronic device of claim 7, wherein the plurality of terminal devices within the first cell and the plurality of terminal devices within the second cell are located in an area where interferences between the first cell and the second cell exist, and a set of resources are multiplexed with a set of predetermined patterns among the plurality of terminal devices within the first cell and the plurality of terminal devices within the second cell.

14. The electronic device of claim 7, wherein serving the particular set of terminal devices by the second electronic device comprises at least conducting data transmission in a user plane by the second electronic device.

15. The electronic device of claim 7, wherein:
   if the plurality of terminal devices access respective cells by SCMA, the resource multiplexing pattern information comprises mapping matrices and constellations for the terminal devices;
   if the plurality of terminal devices access respective cells by PDMA, the resource multiplexing pattern information comprises pattern matrices for the terminal devices; and
   if the plurality of terminal devices access respective cells by IDMA, the resource multiplexing pattern information comprises interleaver identification information for the terminal devices.

16. A method for wireless communication system, comprising: by a first electronic device serving a first cell:
   obtaining user related information of a plurality of terminal devices within a second cell;
   evaluating potential interferences to thia a plurality of terminal devices within the first cell caused by the plurality of terminal devices within the second cell, based on the user related information of the plurality of terminal devices within the second cell;
   determining resource multiplexing pattern information for a plurality of terminal devices within the first cell, the resource multiplexing pattern information for the plurality of terminal devices within the first cell being determined based on user related information of the plurality of terminal devices within the first cell and obtained user related information of the plurality of terminal devices within the second cell; and
   informing a second electronic device serving a second cell of the determined resource multiplexing pattern information for the plurality of terminal devices within the first cell,
   wherein the resource multiplexing pattern information for the plurality of terminal devices within the first cell is such determined that the larger the potential interferences are, the more dedicated resources are reserved for the plurality of terminal devices within the second cell to maintain orthogonality with the plurality of terminal devices within the first cell.

17. A method for wireless communication system, comprising:
   by a second electronic device serving a second cell;
   obtaining resource multiplexing pattern information for a plurality of terminal devices within a first cell, the plurality of terminal devices within the first cell being a particular set of terminal devices which multiplex resources with a set of predetermined patterns; and performing at least one of uplink communication and downlink communication based on the obtained resource multiplexing pattern information;

wherein obtaining the resource multiplexing pattern information for the plurality of terminal devices within the first cell comprises obtaining the resource multiplexing pattern information for the particular set of terminal devices, such that the particular set of terminal devices are served by the second electronic device by using the obtained resource multiplexing pattern information after the particular set of terminal devices are handovered from the first cell to the second cell.

* * * * *